(12) United States Patent
Purohit

(10) Patent No.: US 9,496,982 B2
(45) Date of Patent: Nov. 15, 2016

(54) SYSTEM AND METHOD PROVIDING RESILIENT DATA TRANSMISSION VIA SPECTRAL FRAGMENTS

(75) Inventor: Vinay D. Purohit, Branchburg, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 168 days.

(21) Appl. No.: 13/449,170

(22) Filed: Apr. 17, 2012

(65) Prior Publication Data

US 2012/0224593 A1 Sep. 6, 2012

Related U.S. Application Data

(63) Continuation-in-part of application No. 13/040,458, filed on Mar. 4, 2011.

(60) Provisional application No. 61/476,571, filed on Apr. 18, 2011, provisional application No. 61/486,597, filed on May 16, 2011, provisional application No. 61/523,678, filed on Aug. 15, 2011.

(51) Int. Cl.
*G01R 31/08* (2006.01)
*H04J 3/16* (2006.01)
*H04L 1/00* (2006.01)
*H04L 5/00* (2006.01)

(52) U.S. Cl.
CPC .......... *H04L 1/0009* (2013.01); *H04L 1/0003* (2013.01); *H04L 5/003* (2013.01); *H04L 5/0062* (2013.01)

(58) Field of Classification Search
CPC ... H04W 72/04; H04W 88/08; H04W 78/00; H04W 28/04; H04L 47/10; H04Q 11/478; H04B 1/50

USPC .......................................................... 370/329
See application file for complete search history.

(56) References Cited

U.S. PATENT DOCUMENTS 5,682,195 A 10/1997 Hendricks
5,742,361 A * 4/1998 Nakase ............... H04N 21/434
348/423.1

(Continued)

FOREIGN PATENT DOCUMENTS

CN 1946054 A 4/2007
CN 1949934 A 7/2007

(Continued)

OTHER PUBLICATIONS

The International Search Report and The Written Opinion of the International Searching Authority, or the Declaration in PCT/US2012/026437, mailed Jun. 26, 2012, Alcatel-Lucent USA Inc., Applicant, 14 pages.

(Continued)

*Primary Examiner* — Faruk Hamza
*Assistant Examiner* — Abu-Sayeed Haque
(74) *Attorney, Agent, or Firm* — Tong, Rea, Bentley & Kim, LLC

(57) ABSTRACT

Systems, methods and apparatus for improving resiliency to interference as well as improved bandwidth utilization in data transmission systems by using spectral fragments to convey respective portions of a data stream or file to be transmitted and independently adapting spectral fragment channel forward error correction (FEC) rate or other parameters in response to interference/impairment conditions.

40 Claims, 16 Drawing Sheets

(56) References Cited

U.S. PATENT DOCUMENTS

| | | | |
|---|---|---|---|
| 6,138,147 A | 10/2000 | Weaver et al. | |
| 6,173,429 B1 | 1/2001 | Twitchell et al. | |
| 6,493,873 B1 | 12/2002 | Williams | |
| 6,598,200 B1 | 7/2003 | Greenwood et al. | |
| 7,085,306 B1* | 8/2006 | Voldman | H04B 1/715 348/E7.063 |
| 7,116,652 B2 | 10/2006 | Lozano | |
| 7,218,901 B1* | 5/2007 | Mobley | H04L 12/2801 455/182.2 |
| 7,577,881 B1 | 8/2009 | Shridhar et al. | |
| 7,724,676 B2* | 5/2010 | Gerstel | H04J 14/0227 370/242 |
| 2002/0051461 A1 | 5/2002 | Calderone | |
| 2003/0210663 A1 | 11/2003 | Everson et al. | |
| 2004/0240415 A1* | 12/2004 | Lane | H04L 1/0009 370/335 |
| 2005/0031047 A1 | 2/2005 | Maltsev et al. | |
| 2005/0233710 A1* | 10/2005 | Lakkis | H04B 1/71632 455/102 |
| 2006/0008085 A1 | 1/2006 | Matsuo | |
| 2006/0034164 A1 | 2/2006 | Ozluturk | |
| 2006/0194562 A1 | 8/2006 | Marrah et al. | |
| 2006/0269282 A1* | 11/2006 | Gerstel | H04J 14/0295 398/19 |
| 2007/0049200 A1* | 3/2007 | Nagai | H04B 1/126 455/63.1 |
| 2007/0054682 A1 | 3/2007 | Fanning | |
| 2007/0117532 A1 | 5/2007 | Kim et al. | |
| 2007/0147251 A1* | 6/2007 | Monsen | H04B 7/0632 370/235 |
| 2007/0291854 A1 | 12/2007 | Song | |
| 2008/0112312 A1* | 5/2008 | Hermsmeyer | H04L 45/00 370/228 |
| 2008/0133935 A1 | 6/2008 | Elovici et al. | |
| 2008/0205432 A1 | 8/2008 | Gangwal | |
| 2008/0212708 A1 | 9/2008 | Koslov | |
| 2008/0232298 A1 | 9/2008 | Kim et al. | |
| 2008/0291984 A1 | 11/2008 | Heise et al. | |
| 2009/0086759 A1* | 4/2009 | Heise | H04L 1/0085 370/474 |
| 2009/0161592 A1 | 6/2009 | So | |
| 2009/0175278 A1* | 7/2009 | Harel | H04J 3/1617 370/395.1 |
| 2009/0274240 A1* | 11/2009 | Oshima | H03M 13/256 375/286 |
| 2009/0290659 A1* | 11/2009 | Petrovic | H04H 20/30 375/340 |
| 2010/0021166 A1* | 1/2010 | Way | H04J 14/02 398/79 |
| 2010/0086066 A1 | 4/2010 | Chrabieh et al. | |
| 2010/0118769 A1* | 5/2010 | Agarwal | H04B 7/18578 370/321 |
| 2010/0124332 A1 | 5/2010 | Arena | |
| 2010/0150211 A1 | 6/2010 | Gerakoulis et al. | |
| 2010/0195561 A1 | 8/2010 | Yamaguchi et al. | |
| 2010/0211787 A1 | 8/2010 | Bukshpun et al. | |
| 2010/0211854 A1 | 8/2010 | Wu et al. | |
| 2010/0272190 A1 | 10/2010 | Kim et al. | |
| 2011/0032892 A1 | 2/2011 | Bahl et al. | |
| 2011/0128853 A1 | 6/2011 | Nishimura | |
| 2011/0185168 A1* | 7/2011 | Schlacht | H04N 7/162 713/150 |
| 2012/0163178 A1 | 6/2012 | Gordon et al. | |
| 2012/0182948 A1 | 7/2012 | Huang et al. | |
| 2012/0219066 A1 | 8/2012 | Amonou et al. | |
| 2013/0039251 A1* | 2/2013 | Wilkinson | H04W 36/026 370/312 |
| 2013/0182690 A1 | 7/2013 | Kovacs et al. | |

FOREIGN PATENT DOCUMENTS

| | | |
|---|---|---|
| EP | 0 642 228 A2 | 3/1995 |
| EP | 0 721 267 A2 | 7/1996 |
| EP | 1 921 754 A1 | 5/2008 |
| EP | 1 995 901 A2 | 11/2008 |
| EP | 2 093 957 A1 | 8/2009 |
| EP | 2 264 931 A1 | 12/2010 |
| JP | H 07312593 A | 11/1995 |
| JP | H 0973565 A | 3/1997 |
| JP | H 1065652 A | 3/1998 |
| JP | 2003 198416 A | 7/2003 |
| JP | 2004 056569 A | 2/2004 |
| JP | 2009/290899 | 12/2009 |
| JP | 2010/232857 | 10/2010 |
| WO | WO 02/05506 A2 | 1/2002 |
| WO | WO 02/078211 A2 | 10/2002 |
| WO | WO 02/093779 A2 | 11/2002 |
| WO | WO 2007/149961 A1 | 12/2007 |
| WO | WO 2011/009157 A1 | 1/2011 |
| WO | WO 2011/038272 A1 | 3/2011 |

OTHER PUBLICATIONS

The International Search Report and The Written Opinion of the International Searching Authority, or the Declaration in PCT/US2012/034059, mailed Jun. 27, 2012, Alcatel-Lucent USA Inc., Applicant, 15 pages.

The International Search Report and The Written Opinion of the International Searching Authority, or the Declaration in PCT/US2012/038050, mailed Jul. 3, 2012, Alcatel-Lucent USA Inc., Applicant, 12 pages.

Kholaif A M et al: "DRKH: A Power Efficient Encryption Protocol for Wireless Devices," Local Computer Networks, 2005. 30$^{th}$ Anniversary. The IEEE Conference on Sydney, Australia Nov. 15-27, 2005, Piscataway, NJ, USA, IEEE, November 15, 2005, pp. 822-829, XP010859299.

The International Search Report and Written Opinion of the International Searching Authority, or the Declaration in PCT/2013/040126, mailed Aug. 1, 2013, Alcatel Lucent USA Inc, Applicant, 10 pages.

Office Action received in corresponding Japanese Application No. 2014-506510, dated Dec. 9, 2014, pp. 1-8.

Junichi Abe, et al, "Bandwidth Decomposition Employing Spectrum Editing Technique for High Frequency Utilization Efficiency," Technical Reports of IEICE (Institute of Electronics, Information and Communication Engineers), Dec. 1, 209, vol. 109, No. 340, pp. 7-12.

* cited by examiner

SYSTEM AND METHOD PROVIDING RESILIENT DATA TRANSMISSION VIA SPECTRAL FRAGMENTS

CROSS REFERENCE TO RELATED APPLICATIONS

This application is a continuation-in-part of U.S. patent application Ser. No. 13/040,458, filed Mar. 4, 2011, entitled "VIRTUAL AGGREGATION OF FRAGMENTED WIRELESS SPECTRUM", which application is incorporated herein by reference in its entirety.

This application claims the benefit of U.S. Provisional Patent Application Ser. No. 61/476,571, filed Apr. 18, 2011, entitled INTERFERENCE MITIGATION VIA SLICING AND AGGREGATION OF WIRELESS SIGNALS; Ser. No. 61/486,597, filed May 16, 2011, entitled EFFICIENT FAILOVER SUPPORT USING AGGREGATION OF WIRELESS SIGNALS; and Ser. No. 61/523,678, filed Aug. 15, 2011, entitled DISJOINT REPLICATED SPREAD SPECTRUM which applications are incorporated herein by reference in their entireties.

TECHNICAL FIELD

The invention relates generally to communication networks and, more specifically, but not exclusively, to point-to-point and point-to-multipoint communication networks and backhaul links.

BACKGROUND

Traditional wireless systems assume the availability of a contiguous block of spectrum with bandwidth proportional to the amount of data to be transmitted. Transmission systems are thus frequently designed for worst-case bandwidth requirements with the typical or average use-case, in some instances, requiring much less bandwidth (i.e., spectrum).

Within the context of satellite communications systems and other point-to-point communications systems, available spectrum allocated to customers may become fragmented over time, which leads to unused blocks between allocated blocks of spectrum. When the blocks of unused spectrum are too small, it is necessary to reallocate spectrum among customers or "move" a customer from existing spectral allocation to a new spectral allocation so that the unused blocks of spectrum may be coalesced into a single spectral region. Unfortunately, such reallocation is very disruptive.

SUMMARY

Various deficiencies of the prior art are addressed by the present invention of systems, methods and apparatus for improving resiliency to interference as well as improved bandwidth utilization in data transmission systems by using spectral fragments to convey respective portions of a data stream or file to be transmitted and independently adapting spectral fragment channel forward error correction (FEC) rate or other parameters in response to interference/impairment conditions. Various embodiments also provide failover mechanisms adapted to support to support one or more portions of a protected signal.

A method according to one embodiment comprises dividing a data stream into a plurality of sub-streams; modulating each sub-stream to provide a respective modulated signal adapted for transmission via a respective spectral fragment; monitoring data indicative of channel performance for each of the spectral fragments to identify degraded channels; and adapting, for each degraded channel, one or more respective modulation parameters to compensate for respective identified channel degradation.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be primarily described within the context of a satellite communications system. However, those skilled in the art and informed by the teachings herein will realize that the invention is also applicable to any system benefiting from flexible spectral allocation, such as microwave communications systems, wireless communications systems and the like.

One embodiment provides an efficient and general-purpose technique for aggregating multiple, fragmented blocks of wireless spectrum into one contiguous virtual block such that the cumulative bandwidth is almost equal to the sum of the bandwidths of the constituent blocks. The fragmented blocks are optionally separated from each other by blocks of spectrum, such as guard blocks, blocks owned by other parties, blocks prohibited by the wireless spectrum regulatory authority of a region or country and so on.

Figure 1:
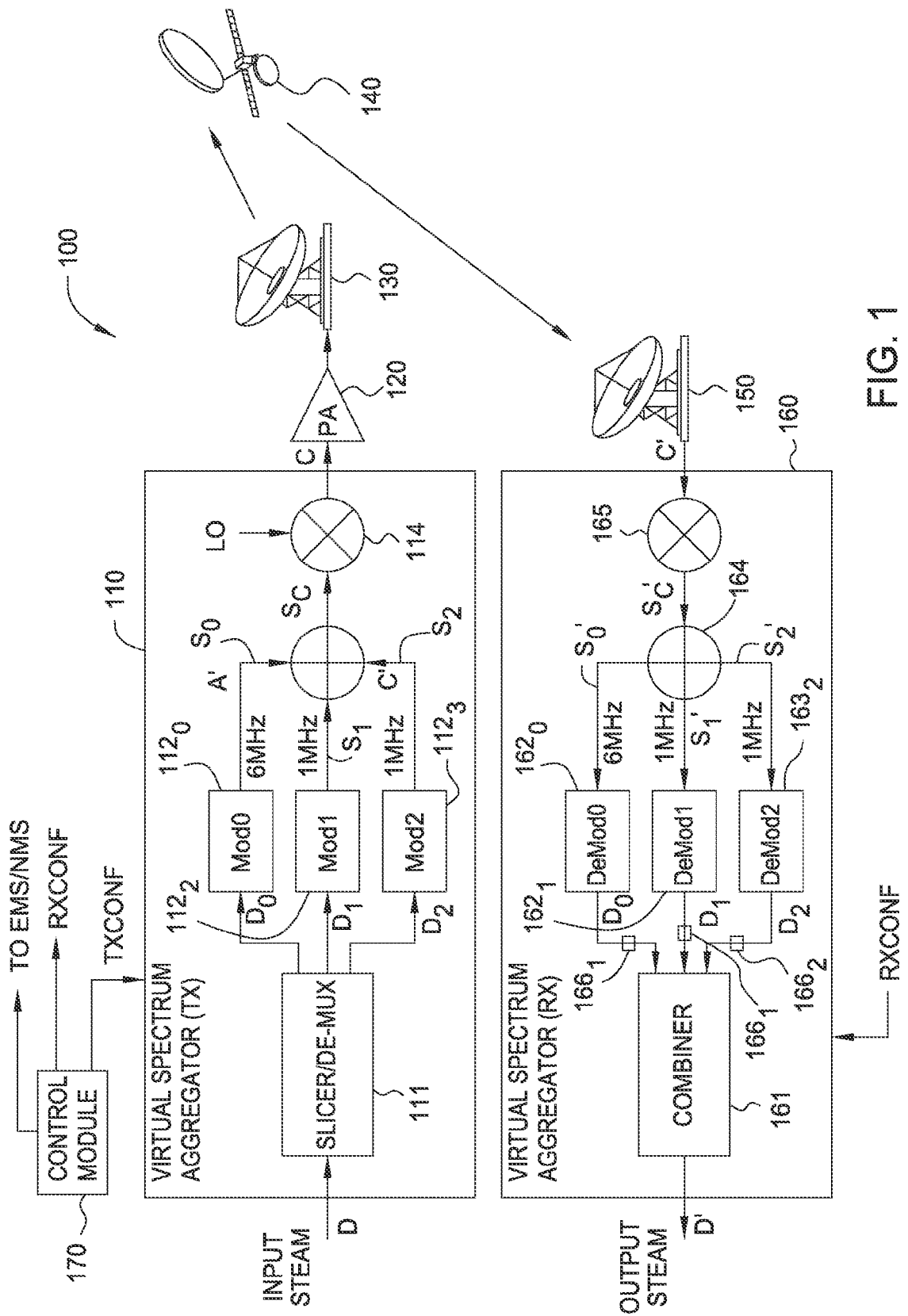
FIG. 1 depicts a block diagram of a communication system according to one embodiment.

FIG. 1 depicts a block diagram of a communication system benefiting from various embodiments. The communication system 100 of FIG. 1 comprises a point-to-point link including a virtual spectrum aggregator transmitter 110, a power amplifier 120, a satellite uplink 130, a satellite 140, a satellite downlink 150, a virtual spectrum aggregator receiver 160 and, optionally, a control module 170. Data to be transmitted over the point-to-point link is provided as a stream of data packets D, such as 188-byte transport stream (TS) packets, 64-1500 bytes Ethernet packets and so on. The specific packet structure, data conveyed within a packet structure and so on is readily adapted to the various embodiments described herein.

The input data stream D is received by the virtual spectrum aggregated transmitter 110, where it is processed by a slicer/demultiplexer 111 to provide N sub-streams ($D_0 \ldots D_{N-1}$), where N corresponds to a number of spectral fragments denoted as $S_0$, $S_1$ and so on up to $S_{N-1}$.

As depicted in FIG. 1, N=3 such that the slicer/demultiplexer 111 slices, the multiplexes and/or divides the input data stream D into (illustratively) three sub-streams denoted as $D_0$, $D_1$ and $D_2$.

Each of the sub-streams $D_0$, $D_1$ and $D_2$ is coupled to a respective modulator 112 (i.e., modulators $112_0$, $112_1$ and $112_2$). Each of the modulators $112_0$, $112_1$ and $112_2$ modulates its respective sub-stream $D_0$, $D_1$ and $D_2$ to provide corresponding modulated signals to be carried by respective spectral fragments $S_0$, $S_1$ and $S_2$.

The modulators 112 may comprise modulators having the same characteristics or having different characteristics, such as the characteristics of waveform type, constellation maps, forward error correction (FEC) settings and so on. Each modulator may be optimized according to a specific type of traffic (e.g., streaming media, non-streaming data and the like), the specific channel conditions associated with its corresponding spectral fragment $S_i$ and/or other criteria.

Generally speaking, the amount of data allocated by the slicer/demultiplexer 111 to any sub-stream $D_i$ is proportional to the data carrying capacity of the corresponding spectral fragment $S_i$. In various embodiments, each of the sub-streams $D_i$ comprises the same amount of data, while in other embodiments the various sub-streams $D_i$ may comprise different amounts of data.

As depicted in FIG. 1, the first modulator $112_0$ provides a 6 MHz signal associated with a first spectral fragment $S_0$; the second modulator $112_1$ provides a 1 MHz signal associated with a second spectral fragment $S_1$; and third modulator $112_2$ provides a 1 MHz signal associated with a third spectral fragment $S_2$.

A frequency multiplexer (i.e., signal combiner) 113 operates to combine the modulated signals to produce a combined modulated signal $S_C$, which is modulated onto a carrier signal by up-converter 114 to provide a modulated carrier signal C. It is noted that multiple frequency multiplexers/signal combiners 113 may be used to multiplex respective groups of modulated signals to be transported via common transponders, microwave links, wireless channels and the like.

In the embodiment of FIG. 1, the spectrum associated with the modulated carrier signal C is logically or virtually divided into the plurality of spectral fragments used to convey the modulated data sub-streams. The spectral fragment allocation table or other data structure is used to keep track of which spectral fragments have been defined, which spectral fragments are in use (and by which data sub-streams), and which spectral fragments are available. Generally speaking, each transponder/transmission channel may be divided into a plurality of spectral fragments or regions. Each of these spectral fragments or regions may be assigned to a particular data sub-stream. Each of the data sub-streams may be modulated according to a unique or common modulation technique.

As depicted in FIG. 1, a single satellite transponder is used and, therefore, all of the modulated signals may be combined by frequency multiplexer 113 prior to up-conversion and transmission via a single satellite channel. In various embodiments, multiple transponders within one or more satellites may be used. In these embodiments, only those modulated signals to be transmitted via a common transponder within a satellite are combined and then converted together. In various embodiments, modulate waveforms are transmitted independently.

The modulated carrier signal C produced by up-converter 114 is amplified by power amplifier 120 and transmitted to satellite 140 via satellite uplink 130. Satellite 140 transmits a modulated carrier signal including the modulated sub-streams $D_0$, $D_1$ and $D_2$ to satellite downlink 150, which propagates the signal to the virtual spectrum aggregator receiver 160.

Virtual spectrum aggregator receiver 160 includes a downconverter (165) which downconverts a combined spectral fragment signal $S_C'$ from a received carrier signal C', and a frequency demultiplexer (164) which operates to separate the spectral fragments $S_0'$, $S_1'$ and $S_2'$ from the combined spectral fragment signal $S_C'$.

Each of the spectral fragments $S_0'$, $S_1'$ and $S_2'$ is coupled to a separate demodulator (i.e., demodulators $162_0$, $162_1$ and $162_2$). Each of the demodulators $162_0$, $162_1$ and $162_2$ demodulates its respective spectral fragments $S_0'$, $S_1'$ and $S_2'$ to provide corresponding demodulated sub-streams $D_0'$, $D_1'$ and $D_2'$.

The demodulated sub-streams $D_0'$, $D_1'$ and $D_2'$ are processed by a combiner 161 to produce an output data stream D' representative of the input data stream D initially processed by the virtual spectrum aggregator transmitter 110. It is noted that each of the demodulators 162 operates in a manner compatible with its corresponding modulator 112.

Optionally, virtual spectrum aggregator receiver 160 includes buffers $166_0$, $166_1$ and $166_2$ which provide an elastic buffering function for the various demodulated sub-streams such that alignment errors induced by different propagation delays associated with the various sub-streams may be avoided prior to combining the sub-streams. The buffers in 166 are depicted as functional elements disposed between the demodulators (162) and combiner 161. In various embodiments, the buffers 166 or their functional equivalent are included within the combiner 161. For example, combiner 161 may include a single buffer which receives data from all of the demodulators (162) and subsequently rearranges that data as output stream D'. Packet ID and/or other information within the sub-streams may be used for this purpose.

Optional control module 170 interacts with an element management system (EMS), a network management system (NMS) and/or other management or control system suitable for use in managing network elements implementing the functions described herein with respect to FIG. 1. The control module 170 may be used to configure various modulators, demodulators and/or other circuitry within the elements described herein with respect FIG. 1. Moreover, the control module 170 may be remotely located with respect to the elements controlled thereby, located proximate transmission circuitry, located proximate receiver circuitry and so on. The control module 170 may be implemented as a general purpose computer programmed to perform specific control functions such as described herein. In one embodiment, control module 170 adapts the configuration and/or operation of the virtual spectrum aggregator transmitter 110 and the virtual spectrum aggregator receiver 160 via, respectively, a first control signal TXCONF and a second control signal RXCONF. In this embodiment, multiple control signals may be provided in the case of multiple transmitters and receivers.

Figure 2:
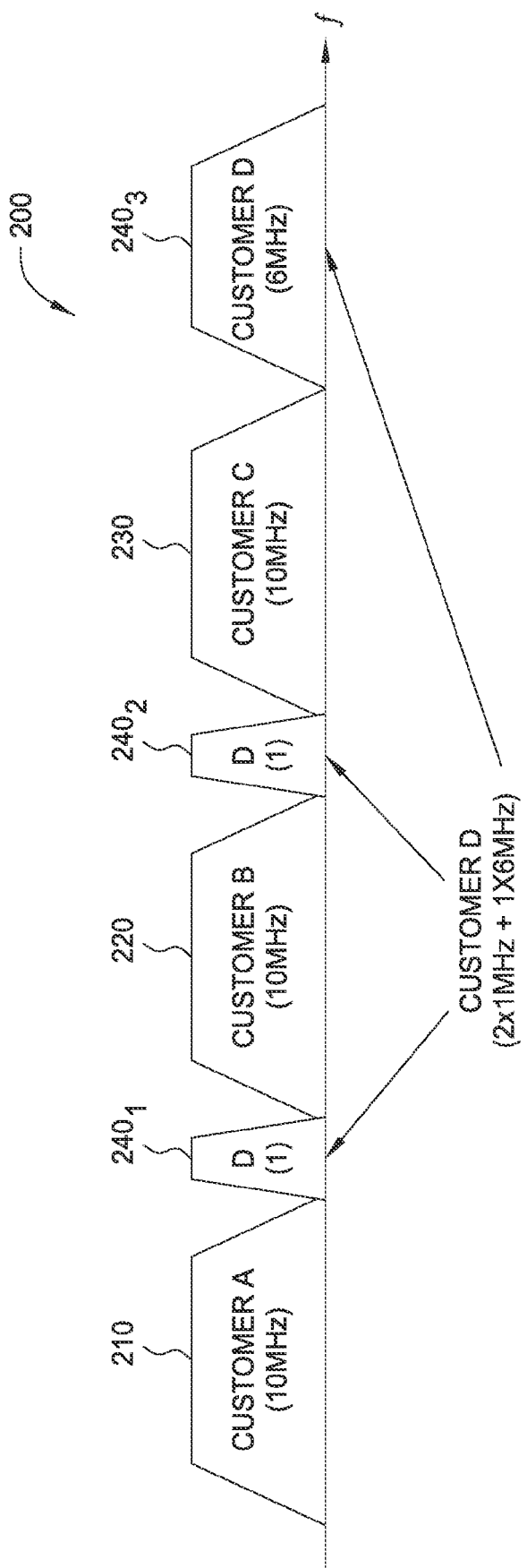
FIG. 2 depicts a graphical representation of a spectral allocation useful in understanding the present embodiments.

FIG. 2 depicts a graphical representation of a spectral allocation useful in understanding the present embodiments. Specifically, FIG. 2 graphically depicts a 36 MHz spectral allocation in which a first customer is allocated a first portion 210 of the spectrum, illustratively a single 10 MHz block; a second customer is allocated a second portion 220 of the spectrum, illustratively single 8 MHz block; a third customer is allocated a third portion 230 of the spectrum, illustratively single 10 MHz block; and a fourth customer is allocated is allocated a fourth portion 240 of the spectrum, illustratively three noncontiguous spectrum blocks comprising a first 1 MHz block $240_1$, a second 1 MHz block $240_1$ and a 6 MHz block $240_3$.

Within the context of the various embodiments discussed herein, the data stream associated with the fourth customer is divided into two different 1 MHz spectral fragments in a single 6 MHz spectral fragment, each of which is processed in substantially the same manner as described above with respect to FIG. 1.

Figure 3:
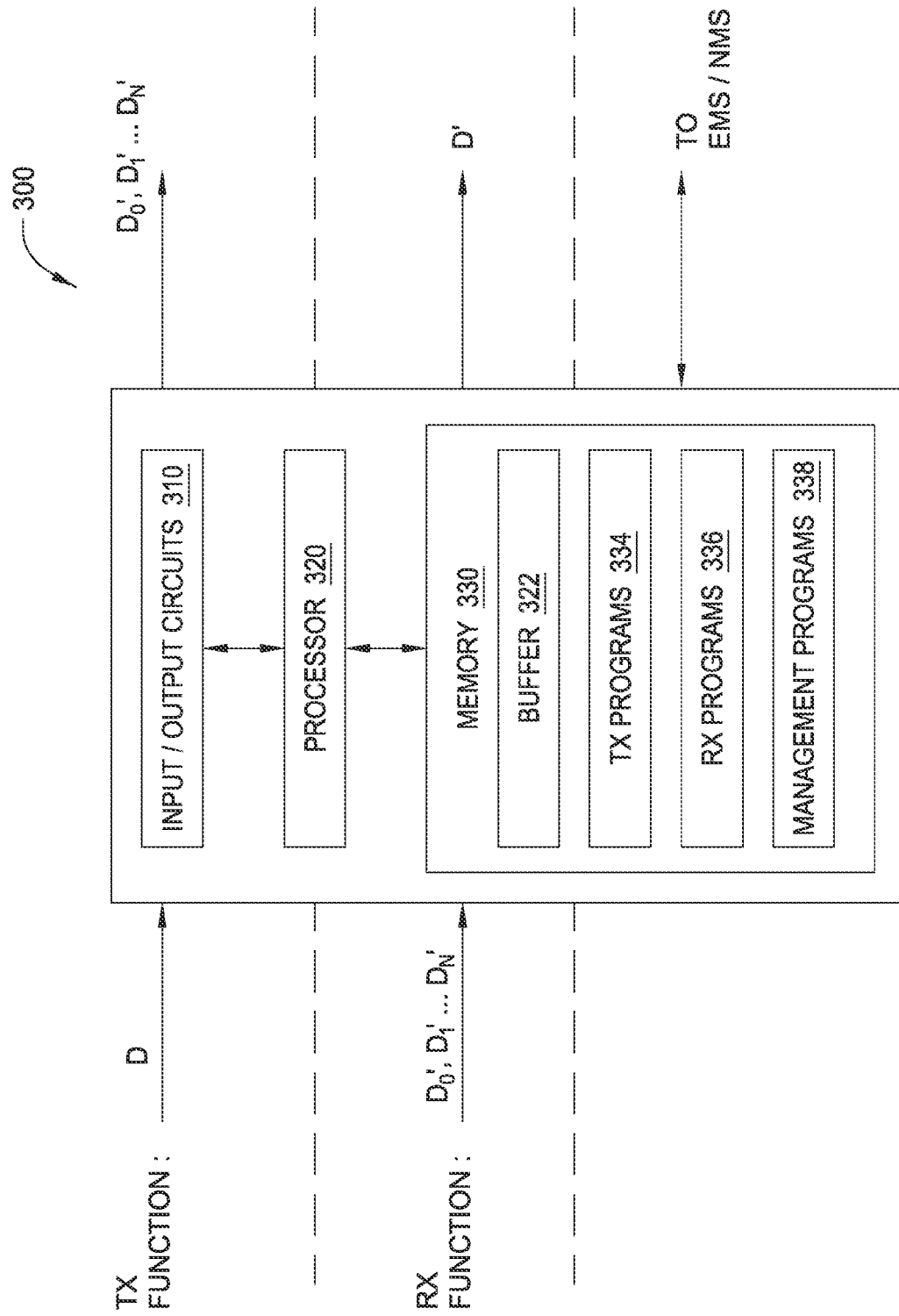
FIG. 3 depicts a high-level block diagram of a general purpose computing device suitable for use in various embodiments.

FIG. 3 depicts a high-level block diagram of a general purpose computing device 300 suitable for use in various embodiments described herein. For example, the computing device 300 depicted in FIG. 3 may be used to execute programs suitable for implementing various transmitter processing functions, receiver processing functions and/or management processing functions as will be described herein.

As depicted in FIG. 3, the computing device 300 includes input/output (I/O) circuitry 310, a processor 320 and memory 330. The processor 320 is coupled to each of the I/O circuitry 310 and memory 330.

The memory 330 is depicted as including buffers 332, transmitter (TX) programs 334, receiver (RX) programs 336 and or management programs 338. The specific programs stored in memory 330 depend upon the function implemented using the computing device 300.

In one embodiment, the slicer/demultiplexer 111 described above with respect to FIG. 1 is implemented using a computing device such as the computing device 300 of FIG. 3. Specifically, the processor 320 executes the various functions described above with respect to the slicer/demultiplexer 111. In this embodiment the I/O circuits 310 receive the input data stream D from a data source (not shown) and provide the N sub-streams ($D_0 \ldots D_{N-1}$) to the demodulators 112.

In one embodiment, the combiner 161 described above with respect to FIG. 1 is implemented using a computing device such as the computing device 300 of FIG. 3. Specifically, the processor 320 executes the various functions described above with respect to the combiner 161. In this embodiment the I/O circuits 310 receive the demodulated sub-streams $D_0'$, $D_1'$ and $D_2'$ from the demodulators 162 (optionally via buffers 166) and provide the output data stream D' representative of the input data stream D initially processed by the virtual spectrum aggregator transmitter 110.

In one embodiment, the optional control module 170 described above with respect to FIG. 1 is implemented using a computing device such as the computing device 300 of FIG. 3.

Although primarily depicted and described as having specific types and arrangements of components, it will be appreciated that any other suitable types and/or arrangements of components may be used for computing device 300. The computing device 300 may be implemented in any manner suitable for implementing the various functions described herein.

It will be appreciated that computer 300 depicted in FIG. 3 provides a general architecture and functionality suitable for implementing functional elements described herein and/or portions of functional elements described herein. Functions depicted and described herein may be implemented in software and/or hardware, e.g., using a general purpose computer, one or more application specific integrated circuits (ASIC), and/or any other hardware equivalents.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, transmitted via tangible media and/or stored within a memory within a computing device operating according to the instructions.

Figure 4:
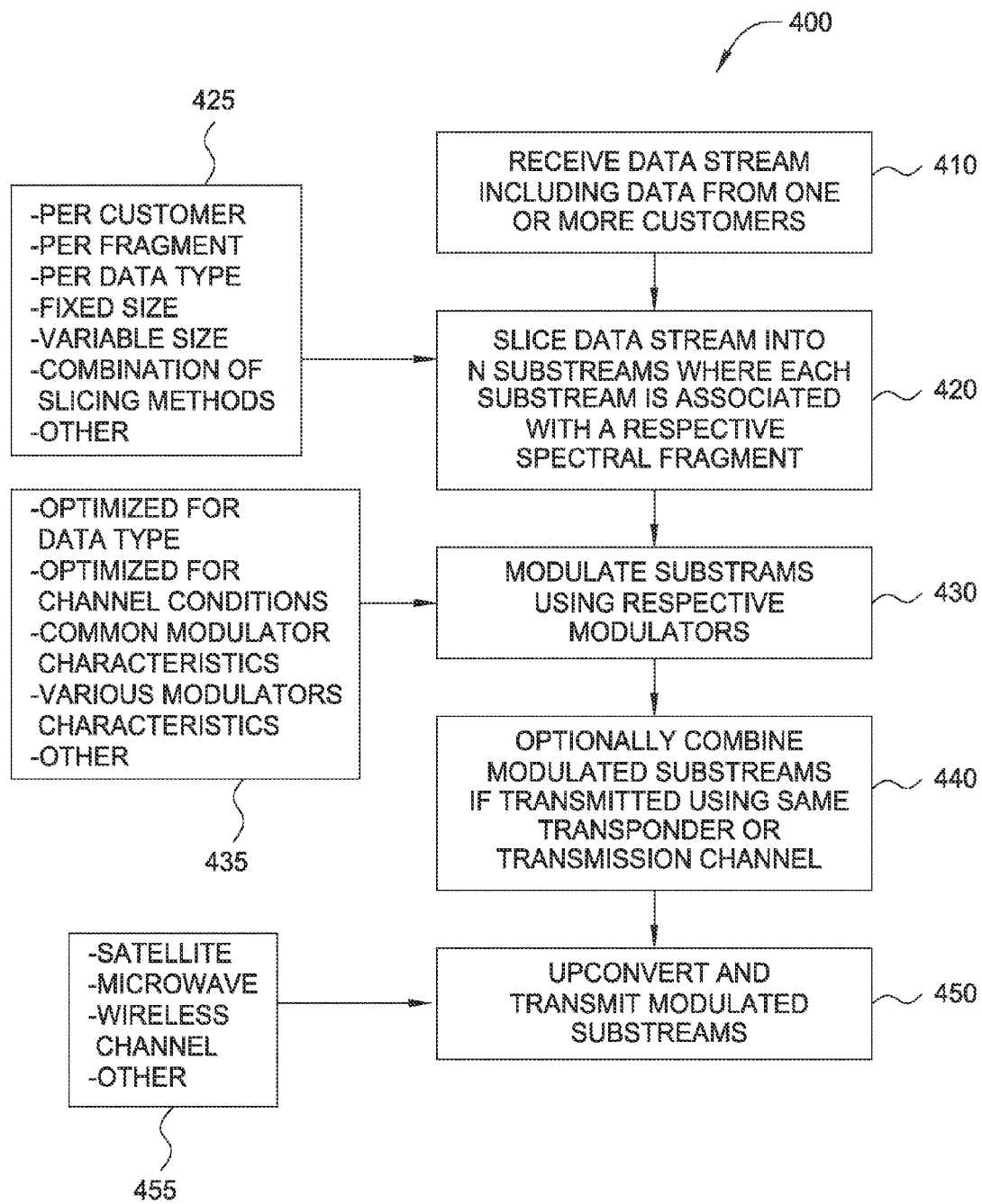
FIGS. 4-6 depicts flow diagrams of methods according to various embodiments.

FIG. 4 depicts a flow diagram of a method according to one embodiment. Specifically, the method 400 of FIG. 4 is suitable for processing a data stream D for transmission, such as described above with respect to FIG. 1.

At step 410, the data stream including data from one or more customers is received, such as by the virtual spectrum aggregated transmitter 110.

At step 420, the received data stream is sliced into N sub-streams, where each sub-streams is associated with a respective spectral fragment. Referring to box 425, the slicing of data streams into sub-streams may be performed using any of the following criteria, alone or in any combination: per customer, per fragment, for data type, fixed size, variable size, combination of various slicing methods and/or other criteria.

At step 430, each of the sub-streams is modulated using a respective modulator. Referring to box 435, demodulators may be optimized for data type, optimized for channel conditions, they share common characteristics, they have various/different characteristics and so on.

At optional step 440, where one or more modulated sub-streams are to be transmitted using the same transponder or transmission channel, these modulated sub-streams are combined.

At step 450, the modulated sub-streams are up converted and transmitted. Referring to box 455, the up conversion/transmission process may be within the context of a satellite communication system, microwave communication system, wireless communication system/channel or other medium.

Figure 5:
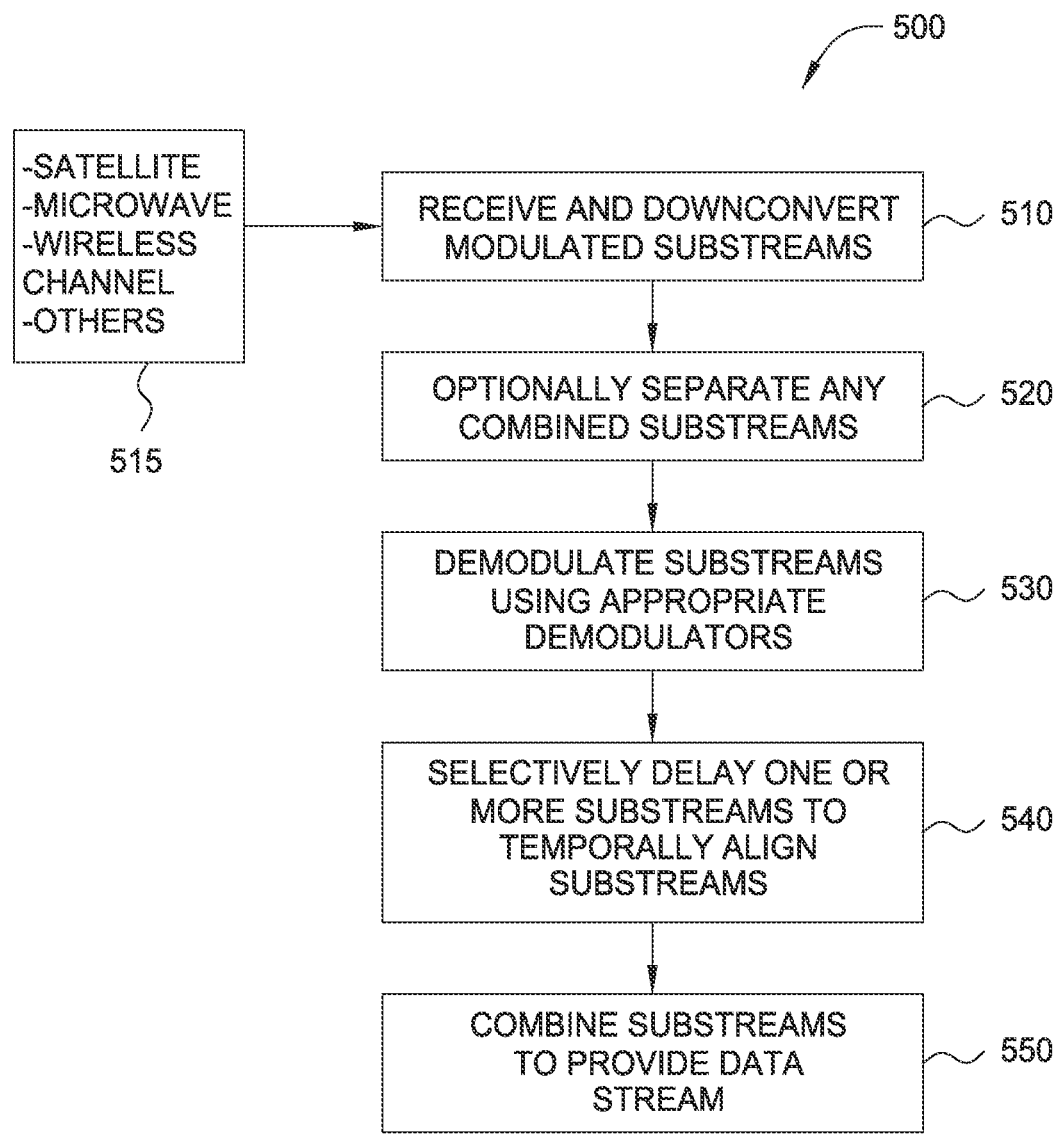

FIG. 5 depicts a flow diagram of a method according to one embodiment. Specifically, the method 500 of FIG. 5 is suitable for processing one or more received sub-streams, such as described above with respect to FIG. 1.

At step 510, one or more modulated sub-streams are received and down converted. Referring to box 515, one or more modulated sub-streams may be received via a satellite communication system, wireless communication system, wireless communication system/channel or other medium.

At step 520, any sub-streams previously combined at the transmitter are separated to provide individual sub-streams, and at step 530 each of the individual sub-streams is demodulated using a respective appropriate demodulator.

At step 540, one or more of the demodulated sub-streams are selectively delayed so that the resulting demodulated data streams may be temporally aligned.

At step 550, the demodulated and selectively delayed sub-streams are combined to provide a resulting data stream such as a data stream D' representative of an input data stream D initially processed by the virtual spectrum aggregator transmitter.

Figure 6:
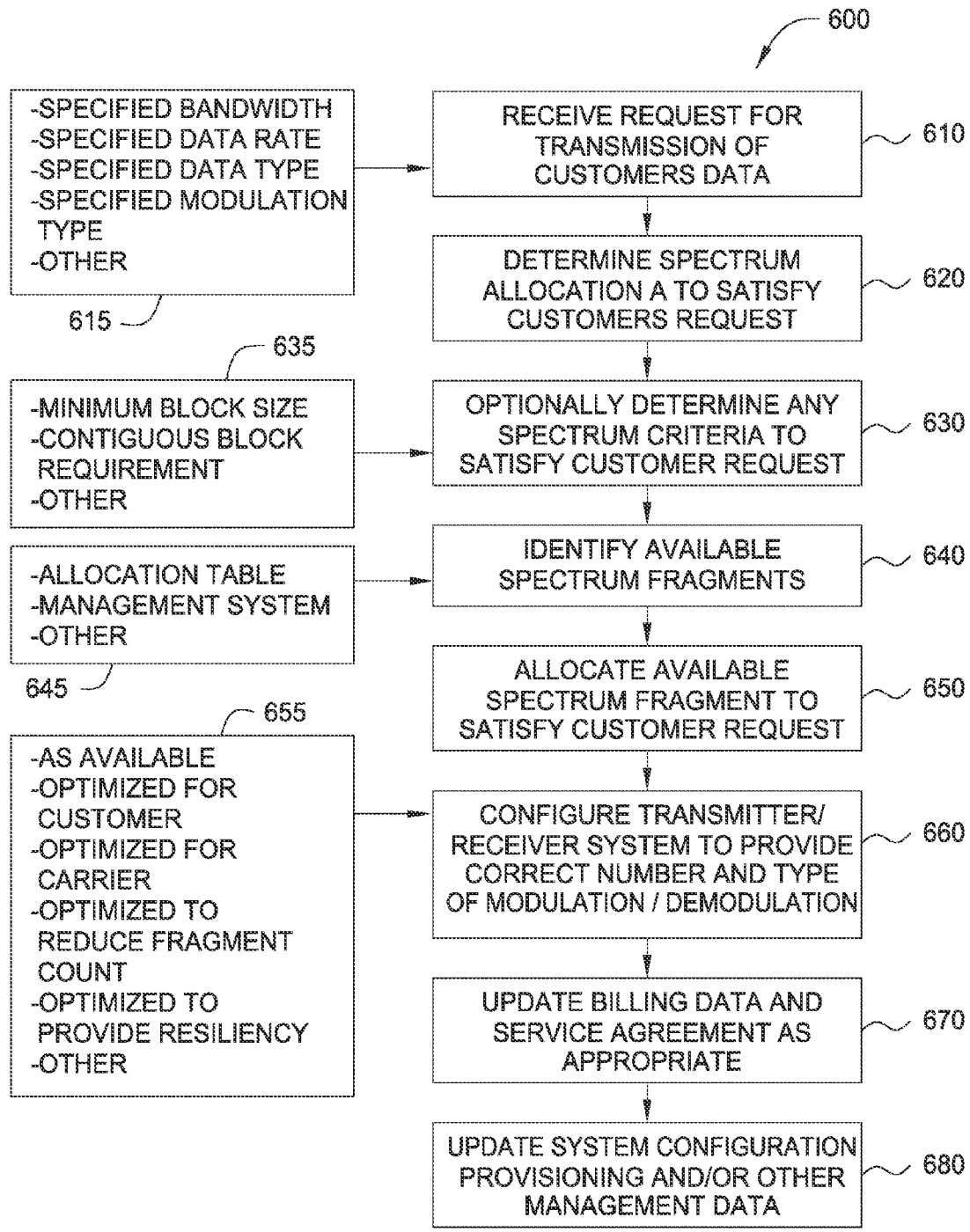

FIG. 6 depicts a flow diagram of a method according to one embodiment. Specifically, the method 600 of FIG. 6 is suitable for configuring various transmitter and receiver parameters in accordance with the various embodiments.

At step 610, a request is received for the transmission of customer data. Referring to box 615, the request may provide a specified bandwidth, a specified data rate, a specified data type, specified modulation type and/or other information describing the bandwidth and/or service requirements associated with the customer data transmission request.

At step 620, a determination is made as to the spectrum allocation suitable for satisfying the customer data transmission request.

At step 630, an optional determination is made as to whether any specific spectrum related criteria is suitable for satisfying the customer data transmission request. Referring to box 635, such spectrum related criteria may include a minimum bandwidth block size, a requirement for contiguous bandwidth blocks and/or other criteria.

At step 640, available spectrum fragments are identified. Referring to box 645, the identification of available spectrum fragments may be made with respect to an allocation table, a management system and/or other source of such information. In one embodiment, an allocation table defines the spectral allocation associated with each customer served by a satellite communications system; namely, the bandwidth allocation of each customer, the transponder(s) supporting the bandwidth, the satellite(s) supporting the transponder(s) and so on. Additionally, available spectrum fragments are defined in terms of size and spectral region for each transponder of each satellite.

At step 650, available spectrum fragments are allocated to satisfy the customer data transmission request. Referring to box 655, the available spectrum fragments may be allocated as available, optimized for the customer, optimized for the carrier, optimized to reduce spectrum fragment count, optimized to provide resiliency or redundancy, and/or optimized based on other criteria.

At step 660, transmitter/receiver systems are configured to provide the correct number and type of modulators/demodulators to support the customer data transmission request and adapt to any changes to spectrum fragment allocations for the requesting customer and/or other customers. That is, based upon optimization and/or other criteria, it may be appropriate to modify the spectral fragment allocations of multiple customers to optimize in favor of a particular customer, service provider and the like.

At step 670, billing data, service agreements and the like are updated as appropriate. At step 680, system configuration, provisioning and/or other management data is updated.

In various embodiments, spectral fragment available on different satellite transponders and/or different satellites are aggregated to form a virtual contiguous block. In other embodiments, the entire bandwidth of multiple transponders is used to support high data-rate pipes (e.g., OC-3/12c) over satellite links.

FIGS. 7-9 depict block diagrams of communication systems according to various embodiments. Each of the various components within the communication systems depicted in FIGS. 7-9 operates in substantially the same manner as described above with respect to corresponding components within the communication system of FIG. 1. For example, in each of the embodiments of FIGS. 7-9, an input data stream D is received by a virtual spectrum aggregated transmitter 110, where it is processed by a slicer/de-multiplexer x11 to provide N sub-streams ($D_0 \ldots D_{N-1}$), where each of the N sub-streams is modulated by respective modulator x12. Other differences and similarities between the various figures will now be described more detail.

Figure 7A:
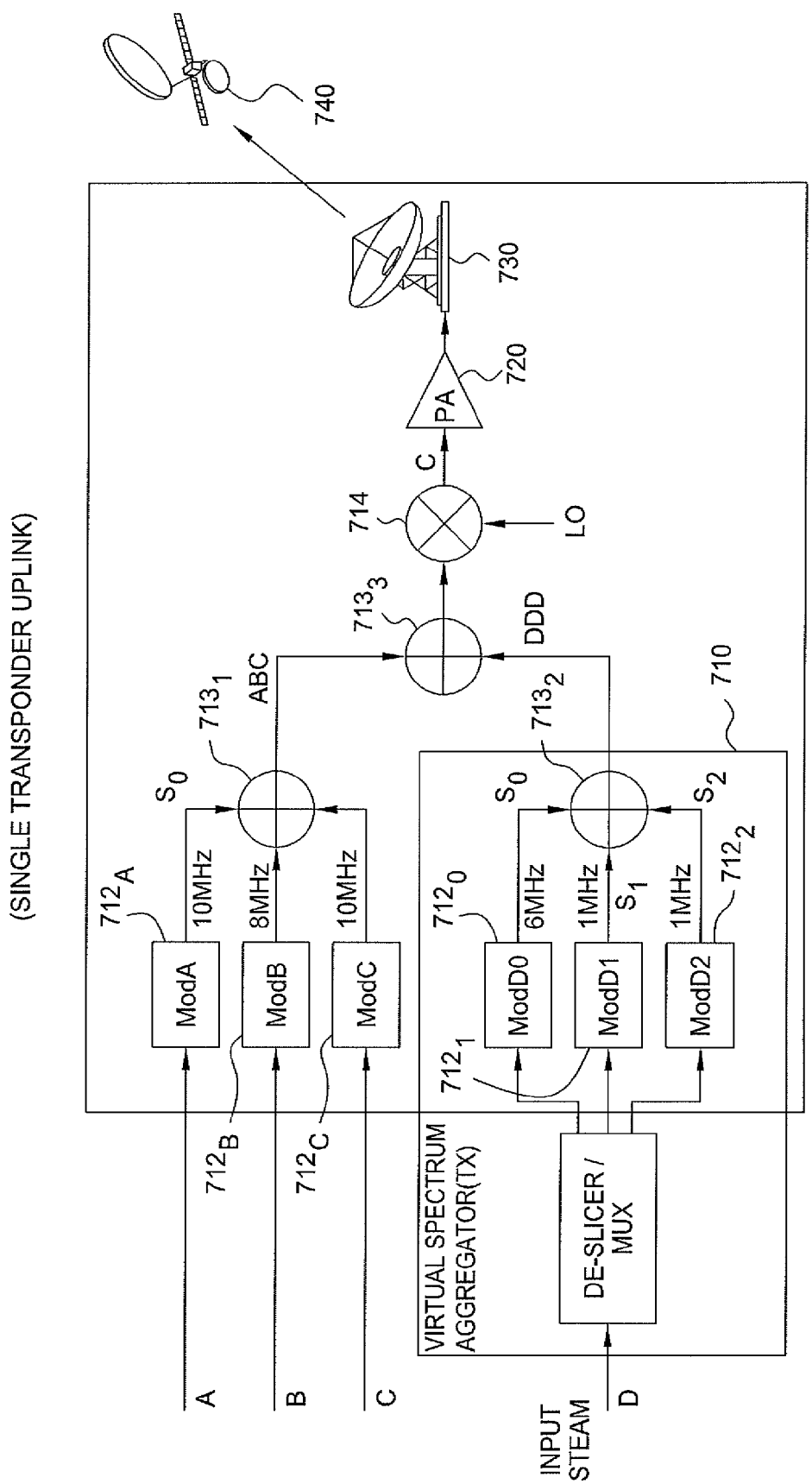
FIGS. 7-9 depicts block diagrams of communication systems according to various embodiments.
Figure 7B:
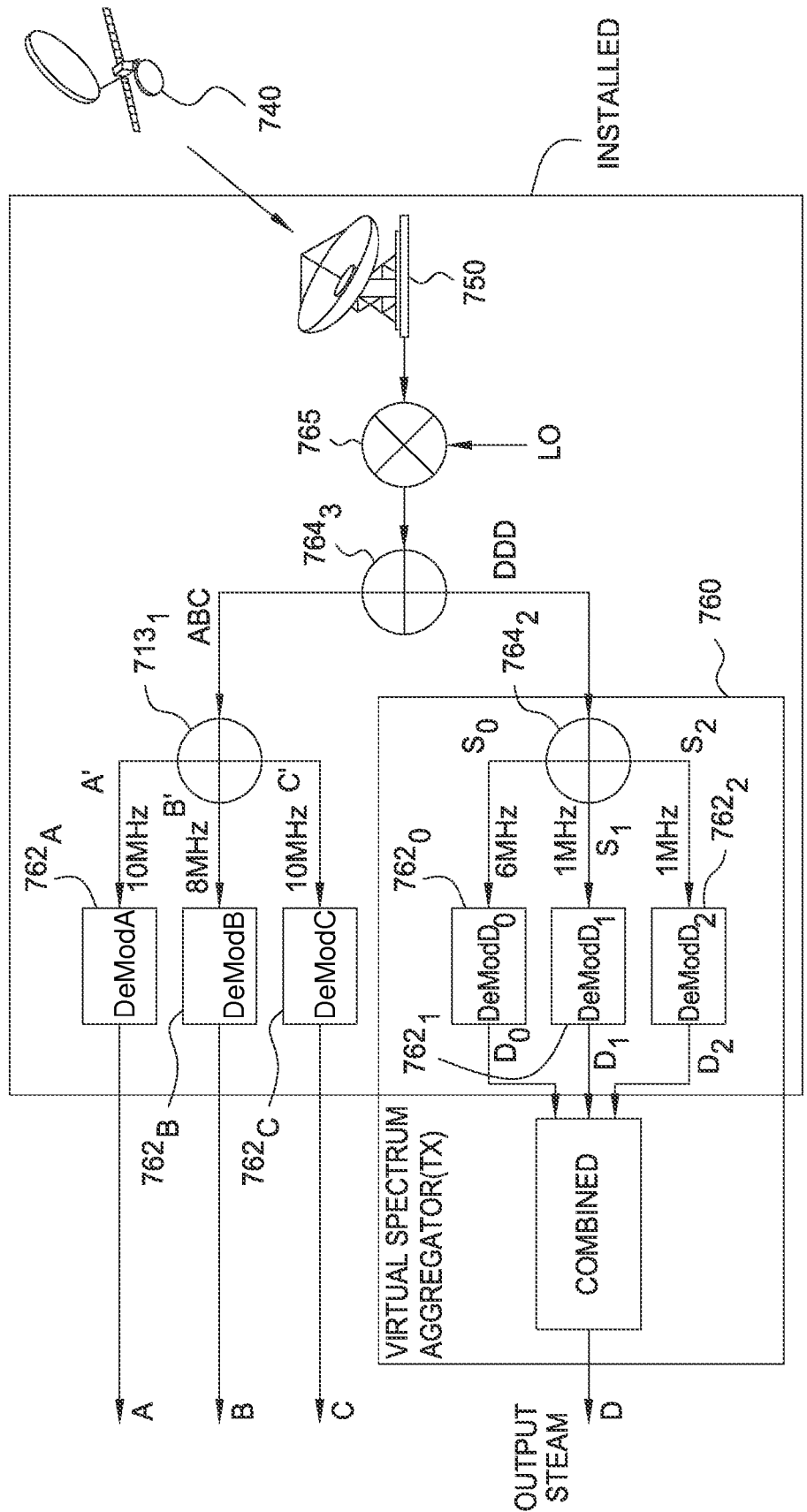

FIG. 7 depicts a single transponder embodiment in which a single transponder is used to transport each of a plurality of data streams denoted as streams A, B, C and D. FIG. 7A depicts an uplink portion of the system, while FIG. 7B depicts a downlink portion of the system.

Referring to FIG. 7A, data streams A, B and C are modulated by respective modulators 712 to produce respective modulated streams which are then combined by a first signal combiner 113$_1$ to provide a combined modulated signal ABC.

Data stream D is processed by a slicer/de-multiplexer 711 to provide N sub-streams ($D_0 \ldots D_{N-1}$) which are then modulated by respective modulators 712 (i.e., modulators 712$_0$, 712$_1$ and 712$_2$) to provide corresponding modulated signals to be carried by respective spectral fragments $S_0$, $S_1$ and $S_2$. The corresponding modulated signals are combined by a second signal combiner 713$_2$ to provide a combined modulated signal DDD, which is combined with modulated signal ABC by a third signal combiner 713$_3$. The resulting combined modulated signals are converted by an up converter 714 to produce a carrier signal C which is amplified by a power amplifier 720 and transmitted towards a satellite 740 via a satellite uplink 730.

Referring to FIG. 7B, satellite 740 transmits a modulated carrier signal including the modulated streams A through D to satellite downlink 750, which propagates the signal to a down-converter, 765. The down-converted signal is processed by a frequency de-multiplexer 164$_3$ which operates to separate the signal into the ABC and DDD signal components.

The ABC signal components are separated by a second frequency de-multiplexer 764$_1$ to recover the modulated signals and then demodulated by respective demodulators 752.

The DDD signal components are separated by a third frequency de-multiplexer 764$_2$ to recover the modulated signals which are demodulated by respective demodulators 752.

The demodulated sub-streams $D_0'$, $D_1'$ and $D_2'$ are processed by a combiner 761 to produce an output data stream D' representative of the input data stream D. It is noted that each of the demodulators 162 operates in a manner compatible with its corresponding modulator 112.

Figure 8A:
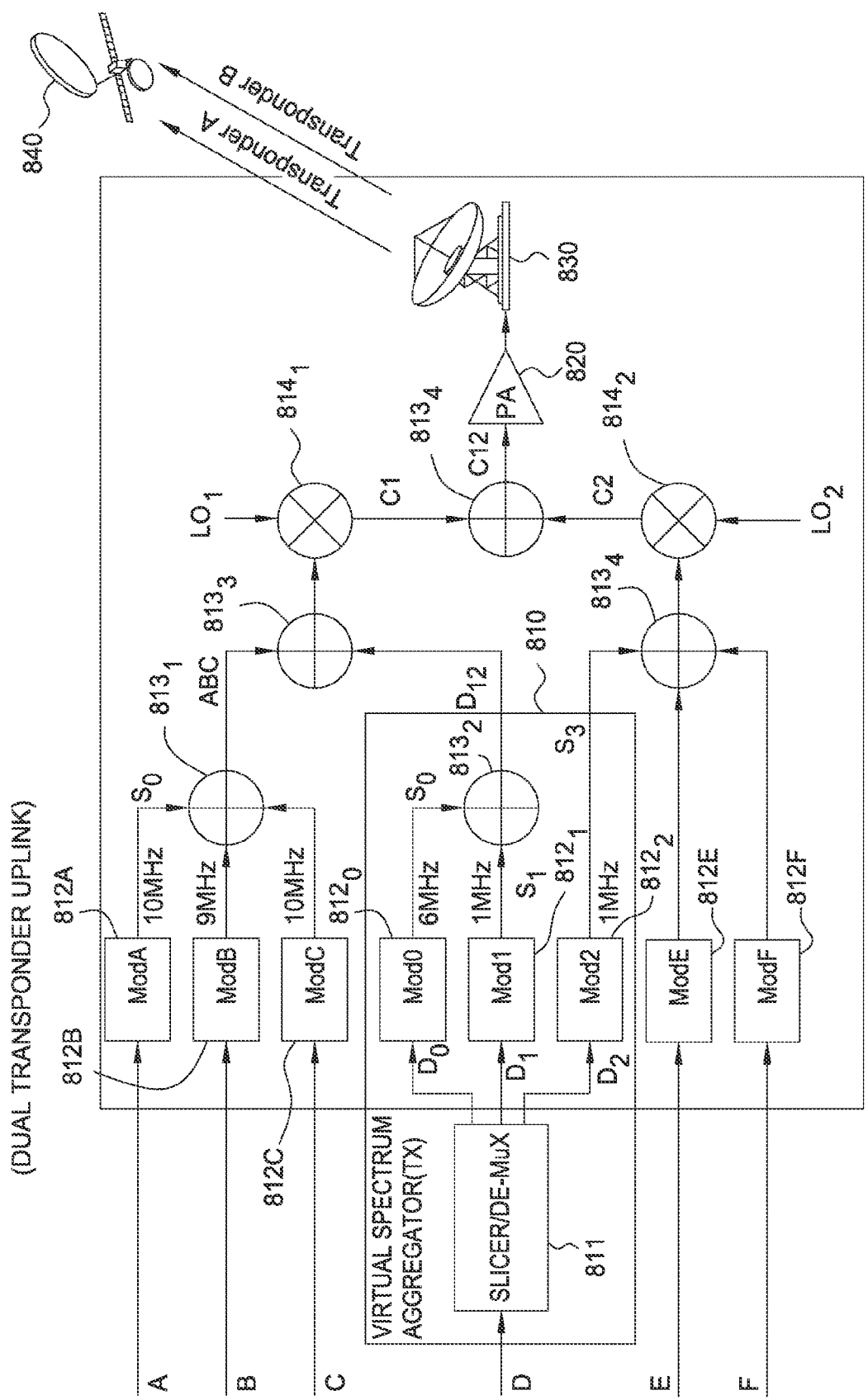
Figure 8B:
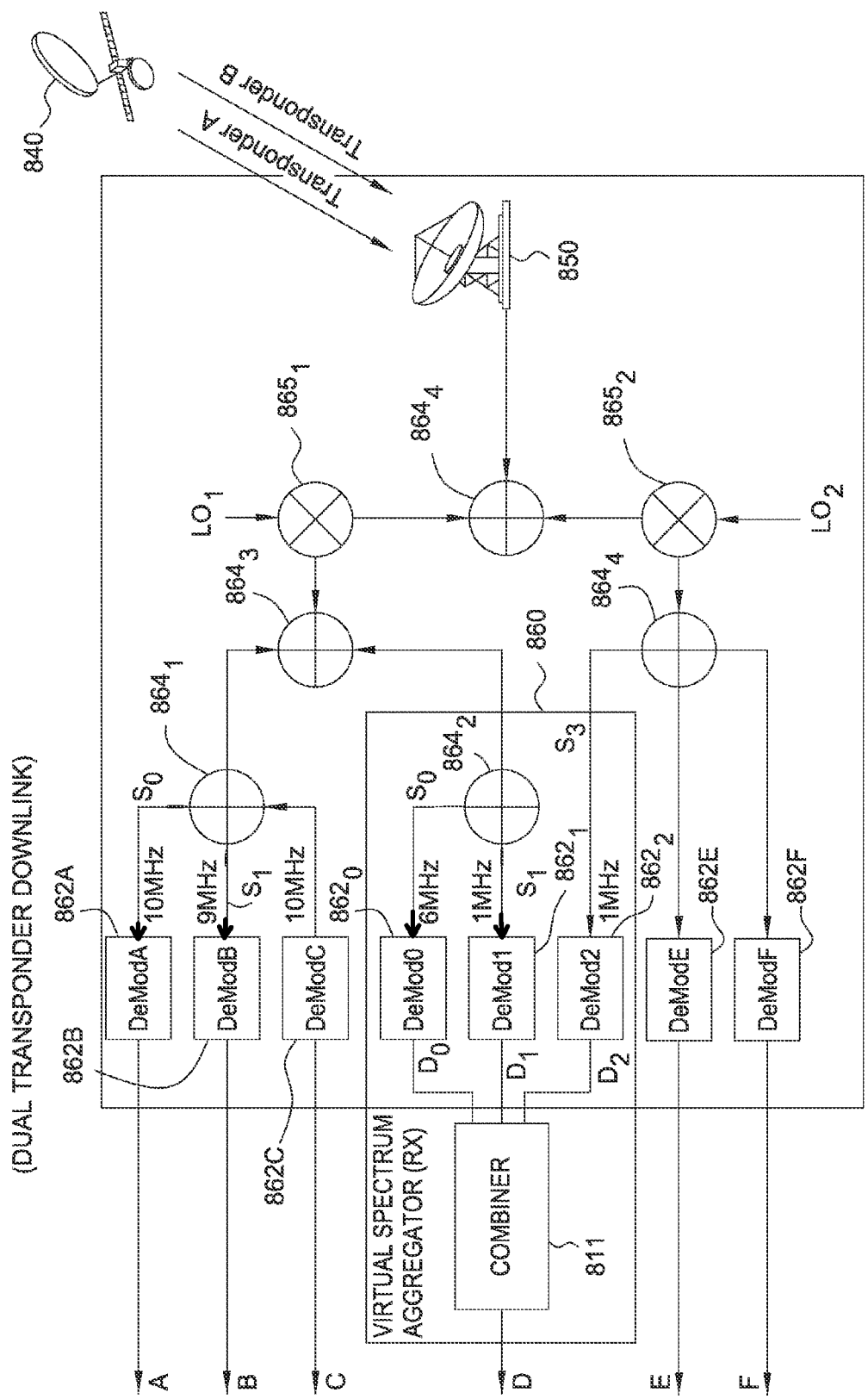

FIG. 8 depicts a dual transponder embodiment in which a first transponder is used to transport each of a plurality of data streams denoted as streams A, B, and C, as well as two of three sub-streams associated with a data stream D, while a second transponder is used to transport each of a plurality of data stream denoted as E and F, as well as the third sub-stream associated with the data stream D. FIG. 8A depicts an uplink portion of the system, while FIG. 8B depicts a downlink portion of the system.

Referring to FIG. 8A, data streams A, B, C, E and F are modulated by respective modulators 812 to produce respective modulated streams.

Data streams E and F are modulated by respective modulators 812 to produce respective modulated signals.

Data stream D is processed by a slicer/de-multiplexer 711 to provide N sub-streams ($D_0 \ldots D_{N-1}$) which are then modulated by respective modulators 712 (i.e., modulators 712$_0$, 712$_1$ and 712$_2$) to provide corresponding modulated signals to be carried by respective spectral fragments $S_0$, $S_1$ and $S_2$.

The modulated signals associated with data streams A, B and C are combined by a first signal combiner $813_1$ to provide a combined modulated signal ABC.

The modulated signals associated with sub-streams $D_0$ and $D_1$ are combined by a second signal combiner $813_2$ to provide a combined modulated signal $D_{12}$.

The combined modulated signals produced by the first $813_1$ and second $813_2$ signal combiners are then combined by a third signal combiner $813_3$ and converted by a first upconverter $814_1$ to produce a first carrier signal C1.

The modulated signals associated with sub-stream $D_3$ and streams E and F are combined by a fourth signal combiner $813_3$ and converted by a second upconverter $814_2$ to produce a second carrier signal C2.

The C1 and C2 carrier signals are combined by a fourth signal combiner, $813_4$, amplified by a power amplifier, 820, and transmitted towards a satellite, 840, via respective transponders (A and B) of a satellite uplink 830.

Referring to FIG. 8B, satellite 840 transmits the two modulated carrier signals including the modulated streams A through F via respective transponders (A and B) to satellite downlink 850, which propagates the signal to a downconverter 865. The down-converted signal is separated into its two carrier signals by frequency demultiplexer $864_4$. The two carrier signals are processed using various demultiplexers in 864, demodulators in 862 and combiner 861 to produce the various output data streams A' through F' representative of the input data stream A through F.

Figure 9A:
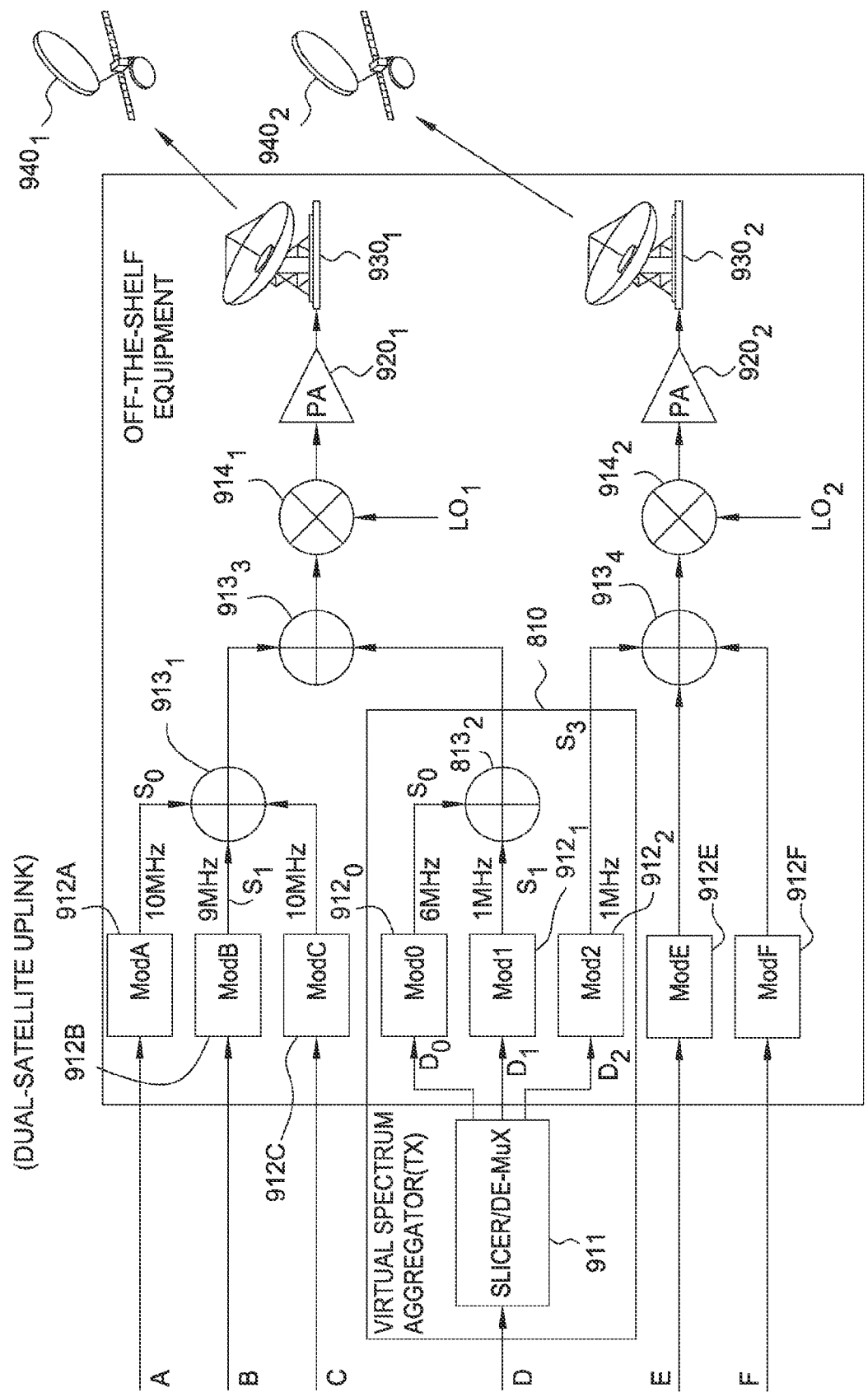
Figure 9B:
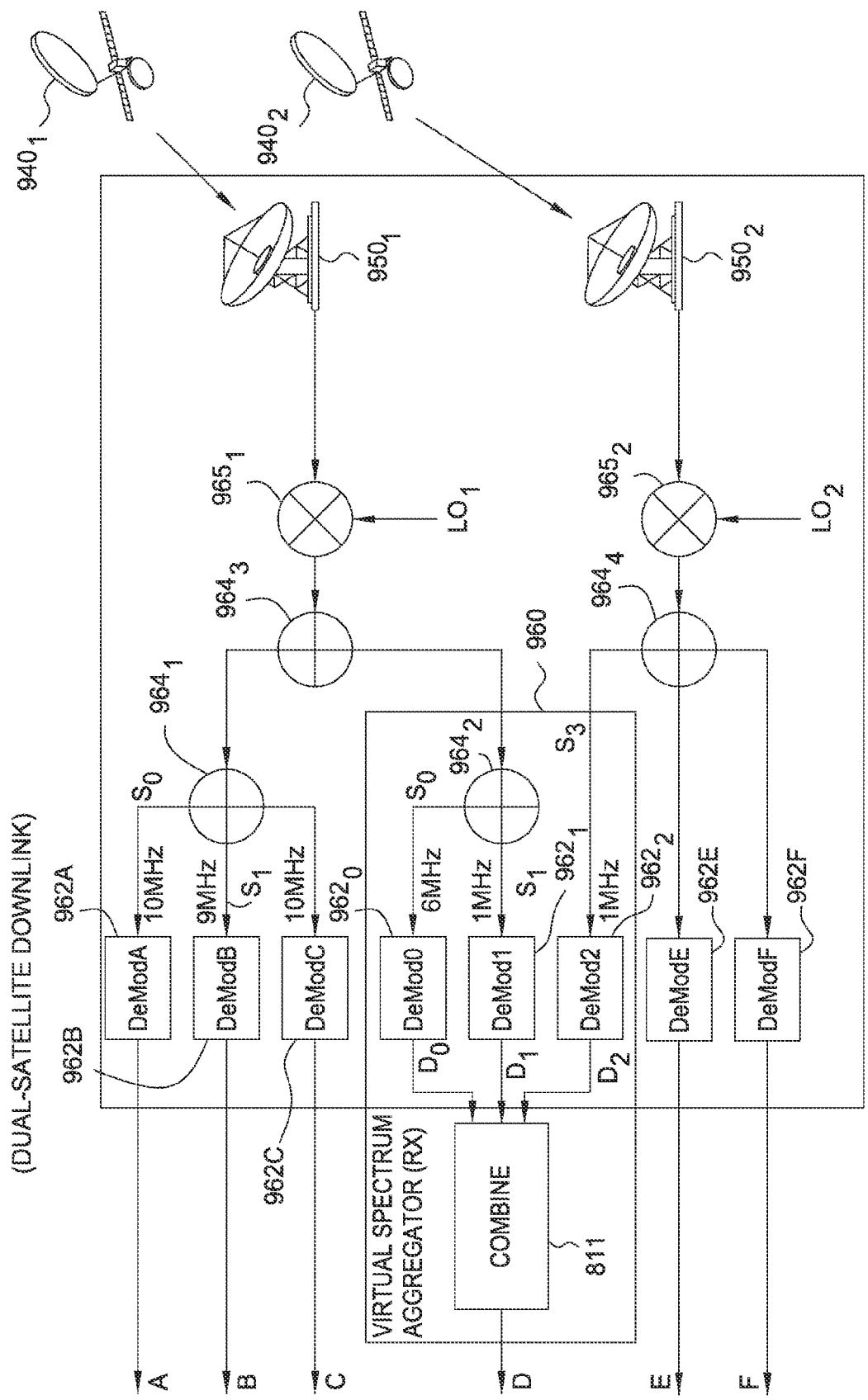

FIG. 9 depicts a dual satellite embodiment in which one satellite ($940_1$) is used to transport a plurality of data streams denoted as streams A, B, and C, as well as two of the three sub-streams associated with data stream D. A second satellite ($940_2$) is used to transport a plurality of data streams denoted E and F as well as the third sub-stream associated with data-stream D. FIG. 9A depicts an uplink portion of the system while FIG. 9B depicts a downlink portion of the system.

Referring to FIG. 9A, data streams A, B, C, E and F are processed in substantially the same manner as described above with respect to FIG. 8A, except that the two carrier signals are not combined for transport via respective transponders of a single satellite. Rather, FIG. 9 shows two carrier signals amplified by separate power amplifiers ($920_1$ and $920_2$) and transmitted to satellites $940_1$ and $940_2$, respectively, using uplinks $930_1$ and $930_2$.

Referring to FIG. 9B, the two satellites 940 transmit their respective modulated carrier signals including modulated streams A through F via respective downlinks 950, which are then fed to respective down-converters 965. The two downconverted carrier signals are processed using de-multiplexers (964), demodulators (962) and a combiner (961) to produce the output data streams A' through F' representative of the input data streams A through F.

Figure 10:
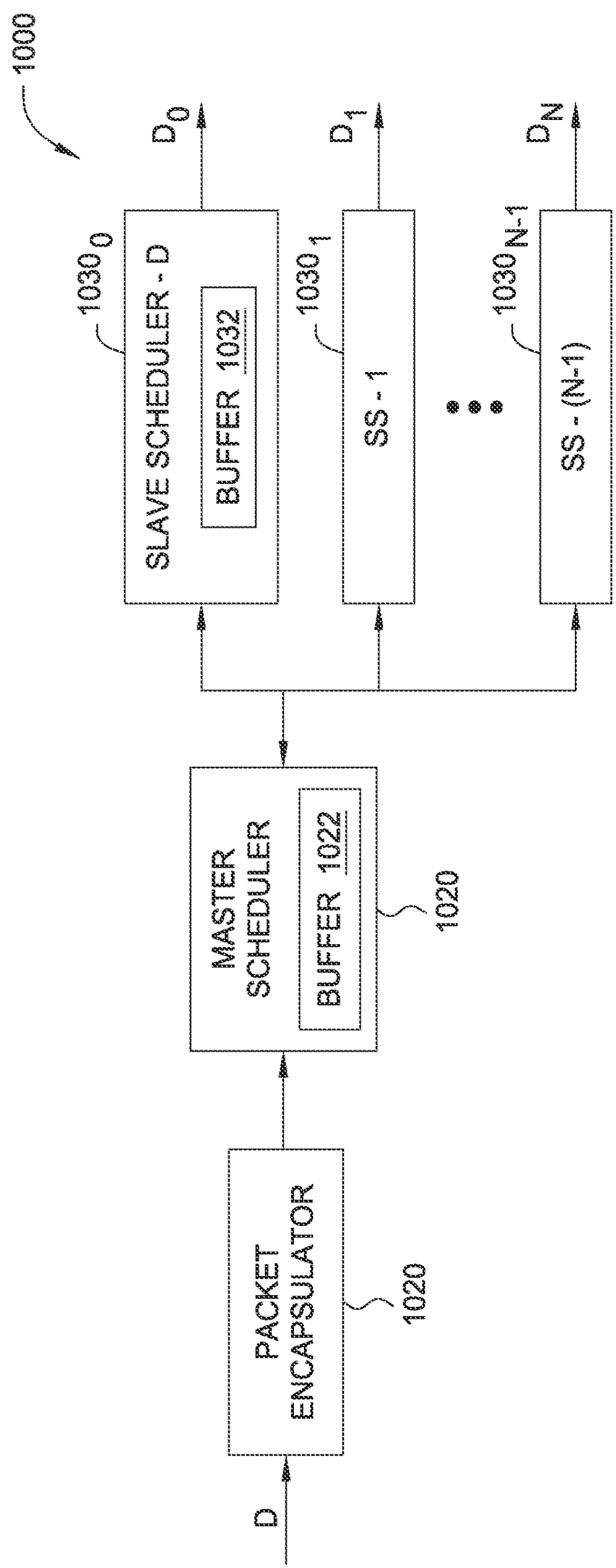
FIG. 10 depicts a high-level block diagram of a slicer/de-multiplexer suitable for use in various embodiments.

FIG. 10 depicts a high-level block diagram of a slicer/de-multiplexer suitable for use in the various embodiments described herein. Specifically, the slicer/de-multiplexer 1000 of FIG. 10 comprises a packet encapsulator 1010, a master scheduler 1020 including a buffer memory 1022, and a plurality of slave schedulers 1030 including buffer memories 1032.

The packet encapsulator 1010 operates to encapsulate packets received from data-stream D into a packet structure having a predefined or normalized format. While various encapsulating packet formats may be used, it is important that the combiner at a downlink side of a system be configured to combine packets according to the encapsulating format used by the slicer/de-multiplexer at an uplink side of the system.

In one embodiment, encapsulating packets comprise 188 byte packets having a 185-byte payload section and a three-byte header section. The packet encapsulator 1010 extracts a sequence of 185 byte portions from the original data stream D, and encapsulates each extracted portion to form encapsulating packet (EP). The header portion of each encapsulating packet stores a user sequence number associated with payload data such that the sequence of 185 byte portions of the data stream may be reconstructed by a combiner, such as described above with respect to the various figures.

In one embodiment, the user sequence number comprises a 14-bit number that is continually incremented and used to stamp encapsulated packets provided by the packet encapsulator 1010. In one embodiment, the header portion of the packet provided by the packet encapsulator 1010 comprises a first byte storing 47 hexadecimal (i.e. 47h), followed by 2 zero bits, followed by 14 bits associated with the user sequence number.

A larger sequence number field (e.g., 24 or 32 bits) may be used when the aggregate data rate being transported is higher. The size of the sequence number field is related to the amount of buffering that takes place at the receiving combiner element described in various figures above. The size of the buffer, in turn, is related to the ratio of the largest sub-stream bandwidth to the smallest sub-stream bandwidth. Thus, various embodiments may adjust the sequence number field size (and the resulting overhead) based on total aggregate bandwidth and/or the ratio of the highest to smallest bandwidth sub-streams.

In various embodiments, more or fewer than 188 bytes are used to construct encapsulating packets. In various embodiments, more or fewer than three bytes are used to construct encapsulating packet headers. For example, by allocating additional header bits to the user sequence number a larger user sequence number may be used. In this case, the likelihood of processing at a receiver two encapsulating packets having the same sequence is reduced.

In the embodiments described herein, the fixed packet size of 188 bytes is used for the encapsulating packets. However, in various alternate embodiments different fixed-sized packets and/or different variable sized packets may be used for different sub-streams as long as such packet sizes are compatible with the input interfaces of the respective modulators used for those sub-streams.

The master scheduler 1020 routes encapsulated packets to the various slave schedulers 1030. The slave schedulers 1030 in turn route their packets to respective output ports of the slicer/demultiplexer, thereby providing respective sub-streams to, illustratively, modulators or other components.

Generally speaking, each slave scheduler 1030 accepts packets conforming to the bandwidth of the spectral fragment assigned to that scheduler. Thus, the slave scheduler servicing a 1 MHz spectral fragment channel accepts packets at a data rate approximately 1/10 that of a slave scheduler serving a 10 MHz spectral fragment or region.

The master scheduler 1020 communicates with the slave schedulers 1030 to identify which slave scheduler 1030 is (or should be) capable of receiving the next encapsulated packet. Optionally, the master scheduler 1020 receives status and other management information from the slave schedulers 1030, and some of this status information may be propagated to various management entities (not shown).

In one embodiment, the slave schedulers 1030 provide a control signal to the master scheduler 1020 indicative of an ability to accept the packet. In one embodiment, the master scheduler 1020 allocates packets to the slave schedulers 1030 in a round robin fashion. In one embodiment, where certain transmission channels or spectral regions are preferred based upon customer and/or service provider requirements, the allocation of encapsulated packet by the master scheduler 1020 is weighted in favor of providing more encapsulated packets to those slave schedulers 1030 servicing the preferred transmission channels.

In one embodiment, each of the slave schedulers is associated with a predefined bandwidth or other indicators of channel capacity associated with the corresponding spectral fragment. In this embodiment, the master scheduler 1020 routes packets according to a weighting assignment for each slave scheduler 1030.

Generally speaking, the master scheduler routes packets according to one or more of a random routing algorithm, a round robin routing algorithm, a customer preference algorithm and a service provider preference algorithm. Such routing may be accommodated by associating a weighting factor with each modulator, spectral fragment, communications channel (e.g., transponder, microwave links, wireless channel etc.) and so on. For example, a preferred spectral fragment may comprise a fragment having a minimum or maximum size, a fragment associated with a relatively low error or relatively high error channel, a fragment associated with a preferred communications type (e.g., satellite, microwave link, wireless network and so on), a fragment associated with a preferred customer and the like. Other means of weighting channels, communication systems, spectral regions and so on may also be used within the context of the various embodiments.

Figure 11:
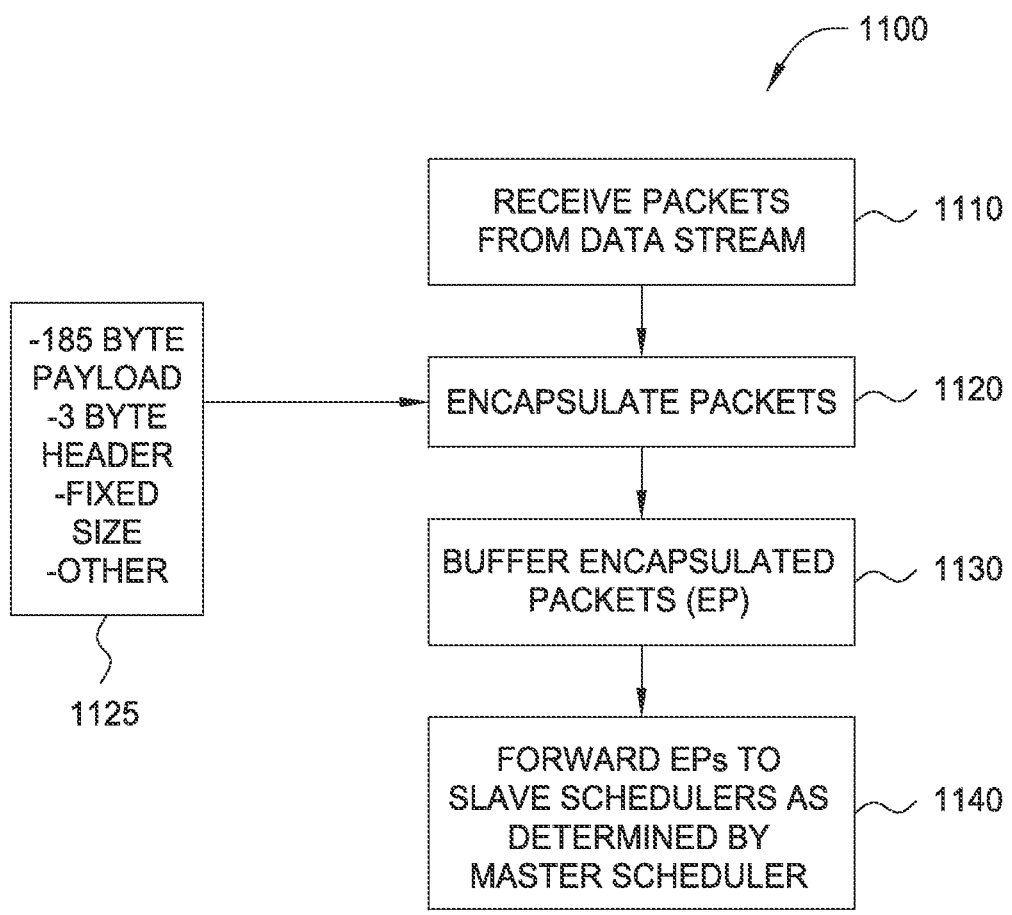
FIG. 11 depicts a flow diagram of a method according to one embodiment.

FIG. 11 depicts a flow diagram of a method according to one embodiment. At step 1110, packets are received from data stream D. At step 1120, received packets are encapsulated. Referring to box 1125, the packet may comprise 185 byte payload and three byte header packets. Other header formats with a different sequence number field size and/or additional control information may be used within the context of the present embodiments.

At step 1130 the encapsulated packets are buffered by, illustratively, the master scheduler 1020, a separate buffer (not shown) within the packet encapsulator 1010 and so on.

At step 1140, encapsulator packets are forwarded (or caused to be forwarded) to the slave schedulers 1030 by the master scheduler 1020.

In the various embodiments described herein, each encapsulated packet is coupled to a respective modulator as part of a respective sub-stream. However, in embodiments adapted to provide increased data resiliency and/or backup, encapsulated packets may be coupled to multiple modulators as part of multiple respective sub-streams. In these embodiments, the sequence number associated with the encapsulated packet remains the same.

In these embodiments, a receiver will process the first encapsulated packet (or error-free encapsulated packet) having the appropriate sequence number and ignore other packets having the same sequence number. That is, when re-ordering encapsulating packets at the receiver, those encapsulating packets having a sequence number matching a sequence number of a recently ordered encapsulating packet are discarded. Since sequence numbers are cyclical or repeated (e.g., every 16,384 encapsulating packets in the case of a 14-bit sequence number), an encapsulating packet having the same sequence number of encapsulating packet processed several thousand packets ago is likely a duplicate of that previously processed encapsulating packet and, therefore, should be dropped or discarded as being redundant.

Various embodiments described herein provide dynamic spectrum aggregation of disjoint blocks of spectrum such that spectrum may be added to or subtracted from existing spectrum allocations as customer bandwidth requirements change. Additionally, small or orphaned spectrum blocks (i.e., those spectrum blocks too small to generally be useful) may be virtually combined to form larger blocks of bandwidth.

The above-described embodiments provide a number of advantages, including improved system resiliency since the loss of any one spectral fragment will likely not cause a complete loss of service. In addition, when spectral fragments are mapped across multiple transponders, the loss of any one transponder does not result in a complete loss of service; rather, a graceful degradation of service is provided. Older/existing schemes utilizing contiguous spectrum are capable of using only one transponder which becomes a potential single point of failure.

Interference Mitigation and Improved Resiliency

For purposes of the following discussion, assume that a transmission mechanism utilizes four carriers, S0 . . . S3 (though different numbers of carriers may be used). Further, that the carriers are separated (not adjacent) in the frequency domain such that any signal interference potentially affects only a subset (and not all) of the slices. Finally, assume that a control channel available (either in-band or out-of-band) for the receiver to provide feedback about the status of the signals to the transmitter. These assumptions may be also by imputed to various other embodiments discussed herein with respect to the various figures.

When a slice, Si, ($0 <= i <= 3$) is affected by interference, the receiving site notices a degradation in the C/N (Carrier to Noise) of that slice. It informs the transmit side about the degradation using a control channel. The transmitter then decreases the FEC rate (makes the FEC stronger, by changing to rate ⅔ from ¾, for e.g.) to enable the receiver the combat the added noise. This scheme is called Adaptive Coding and Modulation (ACM).

Various embodiments discussed herein may be used to enhance the effectiveness of ACM by providing a capability to change the FEC rate of only a specific slice or portion of a data stream (rather than the traditional approach of changing the FEC rate of the entire carrier or data stream). In this manner, higher through put is maintained in the various embodiments vs. traditional techniques.

Various embodiments discussed herein provide that if an interferer is too strong for any available FEC rate to mitigate its effects, then the receiver loses lock on that carrier (e.g., carrier S2) and informs transmitter about the loss. The transmitter re-routes data over carriers S1, S3 and S4. In effect, it is "bypassing" spectral slice S2 and maintains service albeit at a lower throughput. Contrast this with traditional single-carrier schemes where a strong interferer would have completely impaired that carrier causing a complete loss of service.

Various embodiments discussed herein provide different carrier arrangements than previously known. Specifically, rather than the traditional OFDM systems where a signal is comprised of a large number of subcarriers that are adjacent to each other, the various embodiments provide separated and spectrally disjoint carriers. In this manner, front end saturation or pass-band impact of a strong interferer is greatly attenuated in the various slices.

Various embodiments discussed herein enable slices to be transplanted or rerouted to different parts of the spectrum to combat interference, resulting in a complete restoration of service with little degradation in throughput.

Various embodiments discussed herein enable hitless delivery in the presence of strong interference. For example, some embodiments configure a subset of carriers, such as S0 and S1, as a protection group such that impairment of either S0 or S1, but not both simultaneously, results in no loss of data. Under that scenario S2 and S3 may continue to operate as independent carriers without being members of any protection groups. Alternately, they may be grouped into a second protection group to protect each other. As a third alternative, more than two carriers, say S0 . . . S2, may form a protection group and S3 stays independent. Taken to its extreme, all four carriers may be part of a protection group for combating widespread interference, and so on. The degree of flexibility is enormous and configurations can be fine-tuned to most effectively deal with the particular type of interference.

Various embodiments discussed herein enable the addition and deletion of carriers dynamically to further improve resiliency such as caused by equipment failures and/or interference. For example, a system may employ two carriers, S0 and S1, acting independently (i.e., not constituting a protection group) while a third carrier, S2, may be added later in a region of available spectrum if either S0 or S1 are impaired. In one embodiment, the third or spare carrier (e.g., S2) may be configured as a substitute carrier, part of a temporary protection group, part of a dynamically formed protection group.

As a substitute carrier, the spare carrier (e.g., S2) may be configured to act as a "substitute" carrier for either S0 or S1 thus effectively taking over the purpose of the impaired carrier.

As part of a temporary protection group, the spare carrier (e.g., S2) may be configured to form a temporary protection group in alliance or association with the impaired carrier. For example, if S1 is impaired then a protection group between S1 and S2 may be formed. S0 stays independent. When the cause of the impairment is addressed restoring S1, then S2 may be removed.

As part of a dynamically formed protection group, the spare carrier (e.g., S2) may be configured as part of a dynamic formation of Protection Groups among existing carriers, which is effective for combating transient interference that affects multiple carriers for durations long enough to cause packet loss and other impairments, but is not long enough to mandate a complete re-routing of traffic as described above. For example, assume that S0 . . . S3 constitute a four-carrier transmission system, and S2 and S3 experience transient interference that neither per-carrier ACM nor re-routing can effectively address. In this embodiment, S2 and S3 are temporarily paired to constitute a DSS Protection Group while S0 and S1 stay independent. The net result is a robust way of dealing with interference with a temporary reduction in throughput. Once the root cause of the impairments affecting S2 and S3 are addressed, they can be reconfigured to act independently.

Disjoint Replicated Spread Spectrum (DRSS)

The various techniques and embodiments described herein may be adapted to provide Disjoint Replicated Spread Spectrum (DRSS) embodiments which provide "hitless" delivery of payload data in the presence of strong Radio Frequency (RF) interference in wireless communication channels. For example, traditional techniques for wireless communications involves use of single-carrier RF signals that have error-protection code rates designed to deliver Quasi Error Free (QEF) data given the Carrier-to-Noise (C/N) ratio of the communications channel. In the presence of increased interference, the error-protection code rate is reduced (made stronger) to help negate the effects of degradation of the signal at the receiver. A problem with this approach is that a sufficiently strong interferer that is in-band with the received signal and which results in a C/N ratio being lower than the QEF threshold can result in complete loss of data, no matter how strong the code rate. This may be due to (among other reasons) complete saturation of the receiver's front-end RF down-conversion circuitry involving components such as LNAs, mixers and sampling circuits using Analog-to-Digital Converters (ADC). Thus, even the best error-coding technique based on single-carrier systems cannot combat interference that is in-band and greater than the carrier power by the QEF C/N threshold.

DRSS utilizes multiple spectrally-disjoint carriers. In the DRSS technique, the original payload (P) is transmitted over N (N>=2) carriers, each coded and modulated, in the general case, with different physical layer schemes suitable for their respective channel conditions. In a simple embodiment, all carriers are constructed using the same physical-layer parameters but transmitted in spectral blocks that are disjoint (separated) from each other. Carriers, in general, do not have to be of the same spectral bandwidth. However, the information carrying capacity (as determined by the symbol rate, code rate, constellation map, roll-off and other relevant modulation parameters) of each carrier is required to be sufficient to carry the required payload.

At the transmit end, the payload (P) is first pre-processed and broken up into a sequence of fixed-size packets ($p_i$, i=0, 1, 2, . . . ) using the virtual spectrum aggregation (VSA) techniques described above. Each packet $p_i$ at the output of the VSA pre-processor is then replicated N times, and each copy is transmitted over all N carriers.

At the receive end, the receiver demodulates data from each carrier. When all carriers have good C/N, the receiver will recover N error-free copies of each packet, $p_i$. N−1 copies are discarded and one retained for packet $p_i$ for each i. All selected copies are provided to the VSA processor at the receive end where the original payload, P, is reconstructed and delivered to its intended recipient again as described above.

In the presence of strong interference, a subset of the N carriers may experience complete loss of data. However, as long as at least one carrier has its C/N above its QEF threshold at any given time, the receiver will have access to at least one good copy (out of the N copies transmitted) of each packet, $p_i$. This enables the VSA processor at the receiver to reconstruct the payload error-free.

In the above scheme, multiple spectrally-disjoint carriers are less likely to be simultaneously affected by the same interfering signal unless it happens to be extremely broadband. Strong interference may result in a complete loss of data in up to N−1 carriers, but complete recovery of the desired payload is still possible as long as for each packet, $p_i$, there's at least one carrier that is able to deliver that packet error-free. For interference that moves rapidly in the spectral domain, this may imply that consecutive packets are derived from different carriers due to the possibility that a carrier that delivered packet $p_i$, may experience interference thereafter and may not be the most suitable carrier for delivering packet $p_{i+1}$.

Use of the VSA techniques described with respect to FIGS. 1-11 and their associated description allow aggregation of multiple, disjoint spectral slices. When DRSS is used in conjunction with spectral aggregation, a powerful new capability is enabled. For instance, selective use of DRSS enables mapping of carriers to portions of spectrum (such as unlicensed bands) that may be prone to interference. In other words, use of DRSS enables a service provider to start to use noisy or unlicensed bands by mapping either the entire set or a subset of the carriers being aggregated to potentially noisy bands while still delivering the constituent payloads with a high degree of resiliency.

Figure 12:
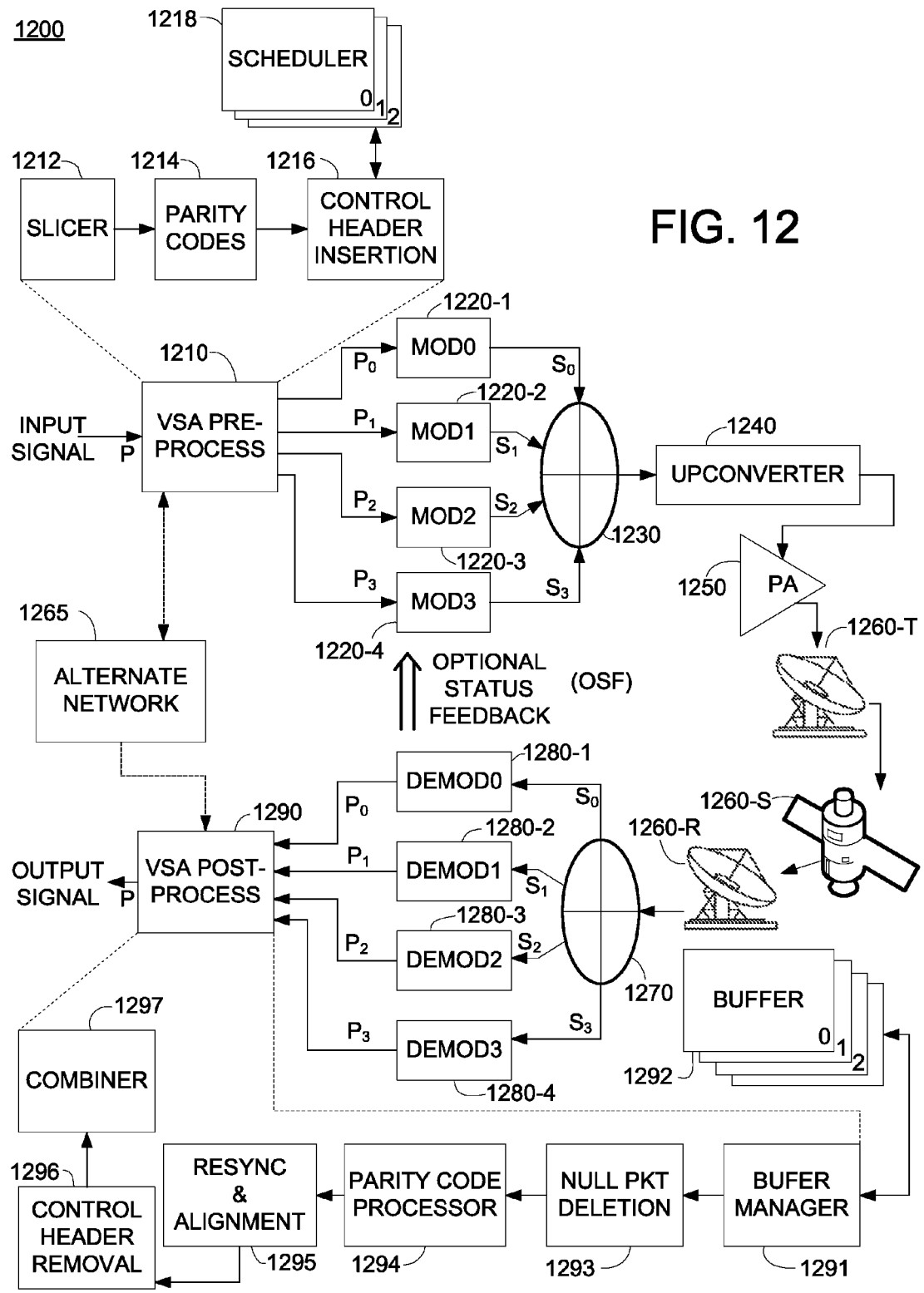
FIG. 12 depicts a high level block diagram of a system benefiting from various embodiments.

FIG. 12 depicts a high level block diagram of a system benefiting from various embodiments. Specifically, FIG. 12 depicts a high level block diagram of a system 1200 that uses the above-described VSA techniques to aggregate, illustratively, four spectral slices S1-S4 including redundant payload communicated over spectral slices S2 and S3. The exemplary system 1200 is a hybrid VSA/DRSS system that transports a payload P using carriers S0, S1, S2 and S3. The exemplary system 1200 is depicted as utilizing a satellite communications link 1260, though other and additional types of communications links may be employed.

The system 1200 generally contemplates a VSA preprocessor, a modulator/transmitter, a communications link, a demodulator/receiver and a VSA postprocessor.

The VSA preprocessor 1210 performs the various slicer functions 1212, parity codes functions 1214, control header insertion functions 1216 and scheduler functions 1218 as discussed herein. The VSA preprocessor 1210 is adapted to process or slice an input signal or stream payload P into, illustratively, four stream portions or segments denoted as $P'_0$ through $P'_3$. As previously noted, each of the four stream portions or segments will be modulated in a manner conforming to a respective spectral slice of a carrier signal, such as a transmitted via a communications link.

The modulator/transmitter comprises, illustratively, four modulators 1220-1 through 1220-4 adapted to respectively modulate payload stream portions or segments as $P'_0$ through $P'_3$ to produce modulated signals $S_o$ through $S_3$, which modulated signals are combined by single combiner/multiplexer 1230. The resulting combined signal is processed by upconverter 1240 and amplifier 1250 to provide, illustratively, a signal suitable for transmission via a communications link 1260.

The communications link 1260 is depicted as a satellite communications link including a transmitter 1260-T which sends the transmission signal to a receiver 1260-R via a satellite 1260-S.

The demodulator/receiver comprises, illustratively, a signal separator/demultiplexer 1270 which extracts the modulated signals $S_o$ through $S_3$ from the received satellite signal, and four demodulators 1280-1 through 1280-4 adapted to demodulate the modulated signals $S_o$ through $S_3$ and retrieve therefrom payload stream portions or segments $P'_0$ through $P'_3$.

The VSA postprocessor 1290 performs various buffer manager functions 1291, buffer functions 1292, no packet deletion functions 1293, parity code processor functions 1294, re-sync and alignment functions 1295, control header removal functions 1296 and combiner functions 1297 as discussed herein. The VSA postprocessor 1290 is adapted to process the illustratively, four stream portions or segments denoted as $P'_0$ through $P'_3$ to reassemble the input signal or stream payload P.

In various embodiments, Spectral Slices S0 and S1 that are independent carriers do not use DRSS. These carrier are assumed to be mapped to "clean" spectrum where strong interference is not usually a problem and standard code rates (such as LDPC ¾, ⅚ and the like, along with a block code such Reed Solomon or BCH) is sufficient for each carrier.

In various embodiments, Spectral Slices S2 and S3 use DRSS. In other words, the payload carried in S2 is replicated and sent over carrier S3. Both S2 and S3 use standard coding techniques (such as LDPC ¾ or ⅚, etc. along with a block code such as BCH or Reed Solomon). This example assumes that carriers S2 and S3 will be mapped to spectrum that may have strong interferers (e.g., malicious or unintentional) capable of causing complete loss of data loss in either S2 or S3. By ensuring a spectral gap between S2 and S3, the probability of interference simultaneously affecting S2 and S3 is minimized. Thus, the aggregated signal may be recovered so long as both S2 and S3 are not affected by interference above a threshold.

In various embodiments, the system is configured such that aggregate capacity of S0, S1 and S2 is sufficient to transport payload P. A similar assumption is made for the aggregate capacity of S0, S1 and S3.

The payload P is sliced into small fixed-size packets, and a control header is inserted at the beginning of each packet conformant to the VSA technique described above. Additional parity codes are appended to allow the receiver to check for header integrity. Three separate schedulers, one each for S0 and S1, and one for the combined set of S2 and S3, are used for allocating the packets to three separate streams denoted $P_0'$, $P_1'$ and $P_{20}'$. $P_{21}'$ is a replica of $P_{20}'$. The schedulers ensure that the amount of data allocated to each carrier does not exceed its information-bearing capacity.

In various embodiments, $P_0'$, $P_1'$, $P_{20}'$ and $P_{21}'$ are fed to separate modulators (Mod0, Mod1, Mod2 and Mod3, respectively) to generate carriers S0, S1, S2 and S3. In various other embodiments, composite modulators are used.

The four carriers are combined using a standard RF combiner, up-converted to the desired frequency band, amplified using a Power Amplifier (PA) and then radiated using an antenna. A bent-pipe satellite sends the signal to potentially multiple receiving sites.

On the receive side, the four carriers are demodulated by four separate demodulators. Packets from the demodulators are queued in separate buffers (one per demodulator). This is necessary because propagation delays of the four carriers may be quite different and may vary over time. Null packets (e.g., introduced by modulators if using DVB-S or DVB-S2 as the physical layer standard) are removed and parity codes are checked to detect and correct control header information vital for the correct processing of the four packet streams. Packets with incorrect parity codes are dropped. A Resynchronization and Alignment block ensures that packets from all available streams are properly sequenced, and duplicate packets received over carriers S2 or S3 (e.g., as would happen when both signals have a good C/N) are dropped. Control headers are stripped and the payload sections of the packets are merged to generate the final payload P.

Interference in S2 and S3 may be localized to specific receive sites or, if present at the transmit side, would impact those signals at all receive sites. In case of localized interference, certain sites may experience a partial or complete loss of data in, say, S2. In those cases, the packets received over S3 are chosen. At other receiver sites, S3 may be impaired in which case packets received over S2 are chosen. If the interference is a sweeper type that may alternately affect S2 and S3, then receivers resort to switching between those two carriers on a per-packet basis.

The system 1200 is depicted as using a bent-pipe satellite communications link 1260. However, in various other embodiments, other types of wireless networks such as a point-to-multipoint terrestrial broadcast system or a point-to-point microwave system for cellular backhaul may be used. More generally, the system can be effectively applied for transport of any data payload (whether synchronous or packetized) over a wireless channel.

In still other embodiments, one or more of the modulated signals is conveyed via an alternate network 1265, such as an optical network, IP network or other wireline network.

Various benefits of the embodiments include significantly higher spectral usage efficiency as well as the ability to use orphaned spectral fragments that are too small to use otherwise. The various embodiments are applicable to satellite applications, point-to-point wireless links such as those used in bent-pipe SatCom applications, wireless backhaul infrastructure such as provided using microwave towers and so on.

The various embodiments provide a mechanism wherein bandwidth may be allocated by "appending" additional blocks of bandwidth to those bandwidth blocks already in use, thereby facilitating a "pay-as-you-grow" business model for service providers and consumers.

In various embodiments, a single transponder in a satellite system is used to propagate a carrier signal including a plurality of modulated sub-streams, each of the modulated sub-streams occupying its respective spectral fragment region. In other embodiments, multiple carrier signals are propagated via respective transponders.

In various embodiments, a single microwave link within a microwave communication system is used to propagate a carrier signal including a plurality of modulated sub-streams, each modulated sub-stream occupying its respective spectral fragment region. In other embodiments, multiple carrier signals are propagated via respective microwave links.

In various embodiments, a single wireless channel within a wireless communication system is used to propagate a carrier signal including a plurality of modulated sub-streams, each modulated sub-stream occupying its respective spectral fragment region. In other embodiments, multiple carrier signals are propagated via respective wireless channels.

Efficient Failover Support Using Protection Groups

By segmenting a stream into a plurality of stream segments and transmitting these stream segments via respective spectral portions, resiliency to interferers such as from malicious sweepers, leaky equipment and the like may be improved.

Various embodiments further improve resiliency by replicating stream segments and modulating/transmitting the replicated stream segments via a different spectral region, optionally using a different modulation technique. In some embodiments, an original or replicated stream segment may be conveyed by a wireline communications link, as discussed above.

Various embodiments further improve resiliency by providing segment-level protection groups in which a stream segment modulated/transmitted within a first spectral region is modulated/transmitted within a backup spectral region in response to channel impairments within the first spectral region exceeding a threshold level. In various embodiments, the backup spectral region comprises a spectral region associated with a lower priority data stream segment. In various embodiments, priority is assigned according to type of data, customer, service level agreement (SLA) profile and/or other criteria.

In various embodiments, rather than allocating a block of active spectrum and another equally large block of backup spectrum that remains unused, several smaller blocks of spectrum are utilized. The spectrum blocks may be allocated to the same or different satellites (or other wireless communications mechanisms), the same or different transponders and so on. For exemplary purposes, it is assumed that the bandwidth capacity of each of the smaller spectral blocks is the same, though this is not a requirement of the various embodiments. Within the context of a backup spectral block or region, the backup spectral block or region should be at least as large as the largest spectral block or region. Where the spectral blocks or regions are of similar size, the backup spectral block or region will also be of the similar size.

In various embodiments, information such as channel status feedback is received at the transmitter. Referring to FIG. 12, optional status feedback (SF) may be received via the alternate network 1265 or any other mechanism. For example, in the typical satellite system a back channel exists which may be used by the receiver to convey information to the transmitter indicative of transmission quality, error rate, buffer back pressure, receiver status and so on. In the various embodiments discussed herein, any of the known mechanisms for providing feedback or status information from a receiver to transmitter may be employed.

Figure 13:
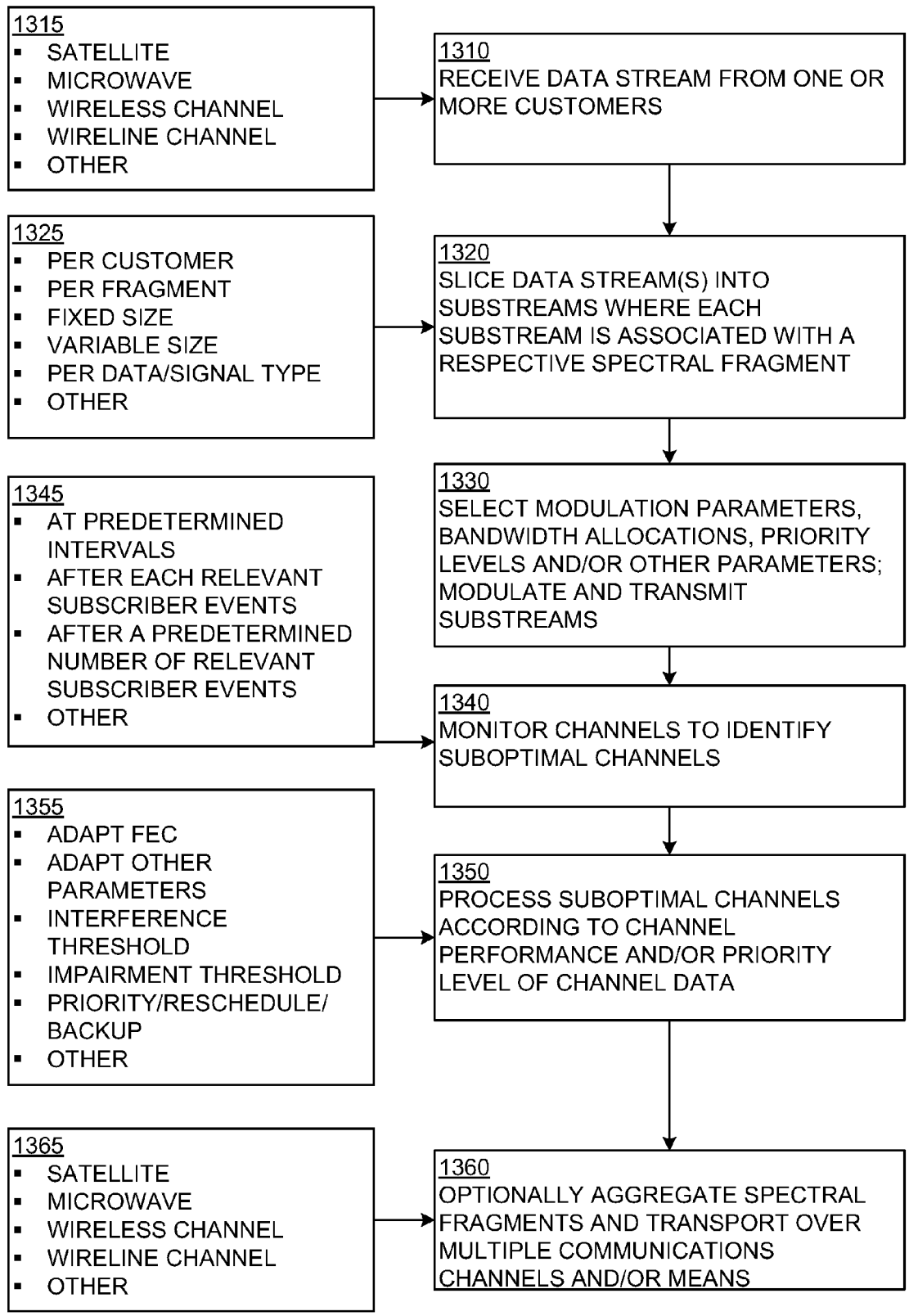
FIG. 13 depicts a flow diagram of a method according to an embodiment.

FIG. 13 depicts a flow diagram according to one embodiment. Specifically, FIG. 13 depicts a flow diagram of a mechanism for providing enhanced channel resiliency with optional prioritization according to the various embodiments. The methodology discussed herein with respect to FIG. 13 may be provided at one or more VSA transmitters such as discussed above.

At step 1310, one or more data streams are received from one or more customers. Referring to box 1315, the one or more data streams may be received via satellite link, microwave link, wireless channel, wireline channel and/or other means.

At step 1320, each of the data streams is sliced into a plurality of stream segments and/or sub-streams, each of the stream segments and/or sub-streams being associated with a respective spectral fragment as discussed above with respect to the various embodiments. Referring to box 1325, the stream segments and/or sub-streams may defined according to customer, available spectral fragments of fixed size or variable size, data type, signal type and/or other parameters.

At step 1330, the various modulation parameters, bandwidth allocations, priority levels and/or other parameters are selected for the stream segments and/or sub-streams and their respective spectral fragments. The various stream segments and/or sub-streams are accordingly modulated and transmitted within their respective spectral fragments.

At step 1340, the various channels associated with the spectral fragments are monitored to identify suboptimal channel behavior, such as channel interference, channel impairments and the like. Referring to box 1345, such monitoring may occur at predetermined intervals, after each relevant subscriber event, after a predetermined number of subscriber events or according to some other schedule. For example, in various embodiments interrupt-driven monitoring is provided wherein receivers only convey information to respective transmitters when a channel is impaired beyond one or more threshold levels, such as one or more levels correctable by adapting forward error correction (FEC) parameters, a level beyond FEC correction ability, a level indicative of channel failure and so on.

At step 1350, suboptimal channels are processed according to channel performance and/or priority level of channel data. Referring to box 1355, the forward error correction (FEC) and/or other parameters associated with the channel may be adapted. Such adaptation may be based upon various thresholds, such as one or more of interference thresholds, one or more impairment thresholds and so on. Within the context of priority level processing (such as where a channel is effectively nonfunctioning), the stream segments and/or sub-streams associated with the channel may be modulated and transmitted via a backup channel(s) or channel(s) associated with lower priority data. That is, a scheduler may adapt the various schedules to accommodate priority segments and/or sub-streams preferentially over lower priority segments and/or sub-streams.

At step 1360, segments and/or sub-streams are optionally aggregated over multiple spectral fragments such that they are transported via multiple communications channels. Additionally, the multiple communications channels may be supported via different communications networks or links. Referring to box 1365, various links include one or more of a point to point links such as satellite links or microwave links, point to multipoint links such as provided by various wireless channels, wireline channels and/or other mechanisms.

The above-described steps contemplate, in response to channel quality degradation or failure, one or both of individual processing of channels to adapt FEC and/or other parameters and channel reallocation based upon priority of data. These steps are implemented in a substantially automatic manner in response to service level agreement (SLA), profile data, default carrier preferences and/or other criteria. Generally speaking, the systems operate in a substantially automated manner to ensure that prioritized data channels are used as efficiently as possible. Different data streams may be associated with different priority levels. Different customers may be associated with different priority levels.

Various embodiments operate to provide automatic rerouting of data by a VSA transmitter over available spectral blocks to bypass one or more failed spectral blocks. Various embodiments operate to provide automatic rerouting of data by the VSA transmitter to provide load balancing functions or otherwise utilize available spectral blocks as efficiently as possible.

As previously discussed, various prioritization techniques may be employed to ensure that high-priority traffic is guaranteed delivery, while low-priority traffic is delivered using spare bandwidth left over from servicing the higher priority traffic or opportunistically inserted data.

Various embodiments support multiple prioritization levels such as by using a Weighted Fair Queuing (WFQ) scheduler for allocation to the various traffic classes.

Various embodiments provide interference mitigation using spectral aggregation. That is, when an interferer (whether CW or complex in nature) degrades a particular channel, only the FEC rate of that particular channel is adapted to compensate for this degradation. If the interferer is too strong to be overcome with better FEC code rates alone (or so strong that the adapted FEC code rate may drop the throughput to unacceptably low levels), then the channel must be reallocated to a different spectral fragment. In particular, the various embodiments provide interference mitigation per-slice FEC rate adjustment (FEC rate of each slice is adjusted depending upon the degree of interference specific to each slice) and spectral slice reallocation (IF interference within a specific slice is too strong and cannot be mitigated with a higher FEC rate, that slice rather than the entire set of slices is relocated to another region of the transponder or another transponder entirely without affecting the other slices).

Various embodiments are adapted to provide improved security via encryption of some or all of the data segments associated with a data stream. That is, in various embodiments channel modulation circuitry is adapted to include encryption functionality, while channel demodulation circuitry is adapted to include decryption functionality. Such encryption/decryption functionality may be based on the use of large encryption keys, frequently changed encryption keys or some combination thereof. Techniques such as AES may also be utilized within the context of the various embodiments. The use of the VSA techniques described herein provide additional layers of security even without encryption. With encryption security becomes extremely robust.

In one embodiment, each data segment and/or channel is encrypted with a common encryption key or technique. In other embodiments, each data segment and/or channel is encrypted with a respective encryption key or technique.

Various embodiments contemplate a system, method, apparatus, computing device and the like operable to perform the various steps and functions discussed herein, such as dividing a data stream into a plurality of sub-streams; modulating each sub-stream to provide a respective modulated signal adapted for transmission via a respective spectral fragment or block; monitoring data indicative of channel performance for each of the spectral fragments to identify degraded channels; and adapting, for each degraded channel, one or more respective modulation parameters to compensate for respective identified channel degradation.

In various embodiments, the one or more modulation parameters are adapted to compensate for identified channel degradation up to a threshold level of degradation. FEC rate and/or other parameters may be adjusted to accomplish this. A spectral gap may be maintained between various spectral fragments or blocks.

In the case of the degradation of an identified channel exceeding a threshold level (e.g., too many errors to correct, too many errors to correct and have sufficient bandwidth etc.) or the channel simply failing, then various embodiments operate to select a backup spectral fragment for use by the modulated signal associated with the identified degraded channel. The sub-stream may need to be remodulated or modulated in a different manner for the newly selected spectral fragment or block. Prioritization among data stream and/or sub-streams may be provided in the case of a limited number of spectral fragments or blocks.

Various embodiments contemplate compound or multiple sub-streams within at least some of the spectral fragments or blocks, such as by combining two or more modulated sub-streams to form respective combined sub-streams, each of the combined sub-streams being modulated onto a modulated signal adapted for transmission via a spectral fragment having a bandwidth compatible with the total effective data rate of combined sub-streams.

Various embodiments contemplate transmitting carrier signals via respective channels within a communications system. For example, each of one or more carrier signals may be supported by a respective transponder within a satellite communications system, a respective microwave link within a microwave communications system, and/or a respective wireless channel within a wireless communications system.

Various embodiments contemplate dividing a data stream into a plurality of sub-streams by encapsulating sequential portions of the data stream into payload portions of respective encapsulating packets, each of the sequential portions of the data stream being associated with a respective sequence number included within a header portion of the respective encapsulating packet; and including each encapsulating packet within a respective sub-stream. Alternatively, each encapsulating packet may be included within one or more of the sub-streams. The sequence number may be represented by a field having at least 14 bits. The encapsulating packet header may includes a hexadecimal 47 in a first byte.

Various embodiments contemplate a receiver for receiving each of the modulated sub-streams via respective spectral fragments; demodulating each of the modulated sub-streams; and combining a plurality of the demodulated sub-streams to recover the data stream. Combining the demodulated sub-streams to recover the data stream may be provided via ordering encapsulating packets received via one or more sub-streams according to their respective sequence numbers; and extracting sequential portions of the data stream from the ordered encapsulating packets to recover thereby the data stream. Discarding of encapsulating packets having a sequence number matching the sequence number of a recently received encapsulating packet may also be provided.

While the foregoing is directed to various embodiments of the present invention, other and further embodiments of the invention may be devised without departing from the basic scope thereof and those skilled in the art can readily devise many other varied embodiments that still incorporate these teachings. As such, the appropriate scope of the invention is to be determined according to the claims, which follow.

What is claimed is:

1. A method, comprising:
  determining a bandwidth of a data stream to be transmitted;
  identifying a set of available spectral fragments, each of the available spectral fragments being defined by a respective bandwidth size;
  allocating at least a portion of the available spectral fragments, as a set of allocated spectral fragments, to support the data stream;
  dividing the data stream into a set of output sub-streams, the output sub-streams being associated with respective ones of the allocated spectral fragments;
  modulating the respective output sub-streams to provide respective modulated signals adapted for transmission via the respective allocated spectral fragments;
  monitoring, for at least one of the respective allocated spectral fragments, data indicative of channel performance of a respective channel associated with the respective allocated spectral fragment;
  based on identification of degraded channel performance of one of the channels associated with one of the allocated spectral fragments, adapting one or more parameters associated with transmission of the one of the allocated spectral fragments to compensate for the identified degraded channel performance, the one or more parameters associated with transmission of the one of the allocated spectral fragments including a forward error correction (FEC) rate; and
  based on a determination that the degraded channel performance of the one of the channels associated with one of the allocated spectral fragments exceeds a threshold level, selecting a backup spectral fragment for use by the modulated signal associated with the one of the allocated spectral fragments.

2. The method of claim 1, wherein said one or more parameters are adapted to compensate for identified channel degradation up to the threshold level.

3. The method of claim 1, further comprising:
  modulating the sub-stream associated with one of the allocated spectral fragments to provide a respective modulated signal adapted for transmission via the backup spectral fragment.

4. The method of claim 1, wherein the backup spectral fragment comprises a spectral fragment supporting a low priority sub-stream.

5. The method of claim 1, wherein the backup spectral fragment comprises a spectral fragment associated with a lower priority sub-stream.

6. The method of claim 1, wherein said threshold level is defined by a bandwidth requirement of the respective modulated signal including an optimal FEC rate and a bandwidth capacity of the respective channel.

7. The method of claim 1, wherein identifying the set of available spectral fragments is performed using an allocation table.

8. The method of claim 7, wherein said allocation table defines a spectral allocation of each customer served via one or more carrier signals supporting the set of allocated spectral fragments.

9. The method of claim 7, wherein, for each customer, said spectral allocation comprises a bandwidth allocation, one or more transponders supporting the bandwidth allocation, and one or more satellites supporting the one or more transponders.

10. The method of claim 1, wherein identifying the set of available spectral fragments is performed using a management system.

11. The method of claim 1, wherein at least two of the allocated spectral fragments are separated by a spectral region.

12. A method, comprising:
  determining a bandwidth of a data stream to be transmitted;
  identifying a set of available spectral fragments, each of the available spectral fragments being defined by a respective bandwidth size;
  allocating at least a portion of the available spectral fragments, as a set of allocated spectral fragments, to support the data stream;
  dividing the data stream into a set of output sub-streams, the output sub-streams being associated with respective ones of the allocated spectral fragments;
  allocating one or more modulation parameters to each of the output sub-streams according to a respective data rate of the respective allocated spectral fragment;
  modulating the respective output sub-streams to provide respective modulated signals adapted for transmission via the respective allocated spectral fragments;
  monitoring signals indicative of performance for each of said allocated spectral fragments to determine respective threshold levels of throughput and to identify degraded channels associated with said allocated spectral fragments;
  adapting a respective forward error correction (FEC) rate for each output sub-stream supported by a respective allocated spectral fragment experiencing channel degradation including a reduced throughput below the respective threshold level of throughput for the respective allocated spectral fragment; and
  rerouting output sub-streams from failed allocated spectral fragments to backup spectral fragments.

13. The method of claim 12, wherein the one or more modulation parameters include a specific bandwidth parameter.

14. The method of claim 12, wherein the allocated spectral fragments associated with optimal throughput characteristic maintain an optimal FEC rate.

15. The method of claim 12, wherein at least a portion of the allocated spectral fragments are associated with a portion of an upconverted carrier signal.

16. The method of claim 15, wherein at least a portion of the allocated spectral fragments are associated with a portion of at least a second upconverted carrier signal.

17. The method of claim 16, wherein the first and second upconverted carrier signals are conveyed using different point to point links.

18. The method of claim 16, wherein the first and second upconverted carrier signals are conveyed using different point to multipoint links.

19. The method of claim 12, wherein said rerouting is performed in a prioritized manner.

20. The method of claim 12, wherein dividing the data stream into the set of output sub-streams comprises:
encapsulating sequential portions of said data stream into payload portions of respective encapsulating packets, each of said sequential portions of said data stream being associated with a respective sequence number included within a header portion of the respective encapsulating packet; and
including each encapsulating packet within a respective one of the output sub-streams.

21. The method of claim 20, wherein said sequence number is represented by a field having at least 14 bits.

22. The method of claim 21, wherein said encapsulating packet header further includes a hexadecimal 47 in a first byte.

23. The method of claim 12, wherein dividing the data stream into the set of output sub-streams comprises:
encapsulating sequential portions of said data stream into payload portions of respective encapsulating packets, each of said sequential portions of said data stream being associated with a respective sequence number included within a header portion of the respective encapsulating packet; and
including each encapsulating packet within one or more of said output sub-streams.

24. The method of claim 12, further comprising:
receiving each of the modulated signals of the respective output sub-streams via the respective allocated spectral fragments;
demodulating each of the modulated signals of the respective output sub-streams to provide a set of demodulated sub-streams; and
combining the demodulated sub-streams to recover the data stream.

25. The method of claim 24, wherein combining the demodulated sub-streams to recover the data stream comprises:
ordering encapsulating packets received via one or more demodulated sub-streams according to their respective sequence numbers; and
extracting sequential portions of said data stream from said ordered encapsulating packets to recover thereby said data stream.

26. The method of claim 25, further comprising discarding encapsulating packets having a sequence number matching the sequence number of a recently received encapsulating packet.

27. A method, comprising:
determining a bandwidth of a data stream to be transmitted;
identifying a set of available spectral fragments, each of the available spectral fragments being defined by a respective bandwidth size;
allocating at least a portion of the available spectral fragments, as a set of allocated spectral fragments, to support the data stream;
dividing the data stream into a set of output sub-streams, the output sub-streams being associated with respective ones of the allocated spectral fragments;
allocating one or more modulation parameters to each of the output sub-streams according to a respective data rate of the respective allocated spectral fragment;
modulating the respective output sub-streams to provide respective modulated signals adapted for transmission via the respective allocated spectral fragments, wherein modulating the respective output sub-streams to provide respective modulated signals adapted for transmission via the respective allocated spectral fragments comprises modulating at least one of the output sub-streams into a plurality of modulated signals;
monitoring signals indicative of performance for each of said allocated spectral fragments to determine respective threshold levels of throughput and to identify degraded channels associated with said allocated spectral fragments; and
adapting a respective forward error correction (FEC) rate for each output sub-stream supported by a respective allocated spectral fragment experiencing channel degradation including a reduced throughput below the respective threshold level of throughput for the respective allocated spectral fragment.

28. The method of claim 27, wherein there is a spectral gap between at least two of the plurality of modulated signals.

29. A method, comprising:
determining a bandwidth of a data stream to be transmitted;
identifying a set of available spectral fragments, each of the available spectral fragments being defined by a respective bandwidth size;
allocating at least a portion of the available spectral fragments, as a set of allocated spectral fragments, to support the data stream;
dividing the data stream into a set of output sub-streams, the output sub-streams being associated with respective ones of the allocated spectral fragments;
allocating one or more modulation parameters to each of the output sub-streams according to a respective data rate of the respective allocated spectral fragment;
modulating the output sub-streams to provide modulated signals adapted for transmission via the allocated spectral fragments, wherein modulating the output sub-streams to provide modulated signals adapted for transmission via the allocated spectral fragments comprises combining two or more of the output sub-streams to form a combined output sub-stream wherein the combined output sub-stream is modulated onto a respective one of the modulated signals adapted for transmission via a respective one of the spectral fragments having a bandwidth compatible with a total effective data rate of the combined output sub-stream;
monitoring signals indicative of performance for each of said allocated spectral fragments to determine respective threshold levels of throughput and to identify degraded channels associated with said allocated spectral fragments; and adapting a respective forward error correction (FEC) rate for each output sub-stream supported by a respective allocated spectral fragment experiencing channel degradation including a reduced throughput below the respective threshold level of throughput for the respective allocated spectral fragment.

30. A method, comprising:

determining a bandwidth of a data stream to be transmitted;

identifying a set of available spectral fragments, each of the available spectral fragments being defined by a respective bandwidth size;

allocating at least a portion of the available spectral fragments, as a set of allocated spectral fragments, to support the data stream, wherein the allocated spectral fragments are supported using a plurality of carrier signals;

dividing the data stream into a set of output sub-streams, the output sub-streams being associated with respective ones of the allocated spectral fragments;

allocating one or more modulation parameters to each of the output sub-streams according to a respective data rate of the respective allocated spectral fragment;

modulating the respective output sub-streams to provide respective modulated signals adapted for transmission via the respective allocated spectral fragments;

transmitting said carrier signals via respective channels within a communications system;

monitoring signals indicative of performance for each of said allocated spectral fragments to determine respective threshold levels of throughput and to identify degraded channels associated with said allocated spectral fragments; and adapting a respective forward error correction (FEC) rate for each output sub-stream supported by a respective allocated spectral fragment experiencing channel degradation including a reduced throughput below the respective threshold level of throughput for the respective allocated spectral fragment.

31. A method, comprising:

determining a bandwidth of a data stream to be transmitted;

identifying a set of available spectral fragments, each of the available spectral fragments being defined by a respective bandwidth size;

allocating at least a portion of the available spectral fragments, as a set of allocated spectral fragments, to support the data stream, wherein the allocated spectral fragments are supported using a plurality of carrier signals, wherein each of said carrier signals is supported by one of a respective transponder within a satellite communications system and a respective microwave link within a microwave communications system;

dividing the data stream into a set of output sub-streams, the output sub-streams being associated with respective ones of the allocated spectral fragments;

allocating one or more modulation parameters to each of the output sub-streams according to a respective data rate of the respective allocated spectral fragment;

modulating the respective output sub-streams to provide respective modulated signals adapted for transmission via the respective allocated spectral fragments;

monitoring signals indicative of performance for each of said allocated spectral fragments to determine respective threshold levels of throughput and to identify degraded channels associated with said allocated spectral fragments; and adapting a respective forward error correction (FEC) rate for each output sub-stream supported by a respective allocated spectral fragment experiencing channel degradation including a reduced throughput below the respective threshold level of throughput for the respective allocated spectral fragment.

32. A method, comprising:

determining a bandwidth of a data stream to be transmitted;

identifying a set of available spectral fragments, each of the available spectral fragments being defined by a respective bandwidth size;

allocating at least a portion of the available spectral fragments, as a set of allocated spectral fragments, to support the data stream, wherein the allocated spectral fragments are supported using a plurality of carrier signals, wherein each of said carrier signals is supported by a respective wireless channel within a wireless communications system;

dividing the data stream into a set of output sub-streams, the output sub-streams being associated with respective ones of the allocated spectral fragments;

allocating one or more modulation parameters to each of the output sub-streams according to a respective data rate of the respective allocated spectral fragment;

modulating the respective output sub-streams to provide respective modulated signals adapted for transmission via the respective allocated spectral fragments;

monitoring signals indicative of performance for each of said allocated spectral fragments to determine respective threshold levels of throughput and to identify degraded channels associated with said allocated spectral fragments; and adapting a respective forward error correction (FEC) rate for each output sub-stream supported by a respective allocated spectral fragment experiencing channel degradation including a reduced throughput below the respective threshold level of throughput for the respective allocated spectral fragment.

33. A non-transitory computer-readable storage medium storing software instructions which, when executed by a computer, cause the computer to perform a method, the method comprising:

determining a bandwidth of a data stream to be transmitted;

identifying a set of available spectral fragments, each of the available spectral fragments being defined by a respective bandwidth size;

allocating at least a portion of the available spectral fragments, as a set of allocated spectral fragments, to support the data stream;

dividing the data stream into a set of output sub-streams, the output sub-streams being associated with respective ones of the allocated spectral fragments;

allocating one or more modulation parameters to each of the output sub-streams according to a respective data rate of the respective allocated spectral fragment;

monitoring signals indicative of performance for each of said allocated spectral fragments to determine respective threshold levels of throughput and to identify degraded channels associated with said allocated spectral fragments;

adapting a respective forward error correction (FEC) rate for each output sub-stream supported by a respective allocated spectral fragment experiencing channel degradation including a reduced throughput below the respective threshold level of throughput for the respective allocated spectral fragment; and rerouting output sub-streams from failed allocated spectral fragments to backup spectral fragments.

34. A non-transitory computer program product comprising a non-transitory computer-readable storage medium storing software instructions which, when executed by the computer, cause the computer to perform a method, the method comprising:

determining a bandwidth of a data stream to be transmitted;

identifying a set of available spectral fragments, each of the available spectral fragments being defined by a respective bandwidth size;

allocating at least a portion of the available spectral fragments, as a set of allocated spectral fragments, to support the data stream;

dividing the data stream into a set of output sub-streams, the output sub-streams being associated with respective ones of the allocated spectral fragments;

allocating one or more modulation parameters to each of the output sub-streams according to a respective data rate of the respective allocated spectral fragment;

monitoring signals indicative of performance for each of said allocated spectral fragments to determine respective threshold levels of throughput and to identify degraded channels associated with said allocated spectral fragments;

adapting a respective forward error correction (FEC) rate for each output sub-stream supported by a respective allocated spectral fragment experiencing channel degradation including a reduced throughput below the respective threshold level of throughput for the respective allocated spectral fragment; and rerouting output sub-streams from failed allocated spectral fragments to backup spectral fragments.

35. An apparatus for transmitting a data stream, the apparatus comprising:

a controller configured to determine a bandwidth of the data stream, identify a set of available spectral fragments wherein each of the available spectral fragments is defined by a respective bandwidth size, and allocate at least a portion of the available spectral fragments, as a set of allocated spectral fragments, to support the data stream;

a splitter configured to divide the data stream into a set of output sub-streams, the output sub-streams being associated with respective ones of the allocated spectral fragments; and a set of modulators configured to modulate respective ones of the output to provide respective modulated signals adapted for transmission via the respective allocated spectral fragments;

the controller further configured to:

monitor, for at least one of the respective allocated spectral fragments, data indicative of channel performance of a respective channel associated with the respective allocated spectral fragment; and adapt, based on identification of degraded channel performance of one of the channels associated with one of the allocated spectral fragments, one or more parameters associated with transmission of the one of the allocated spectral fragments to compensate for the identified degraded channel performance, the one or more parameters associated with transmission of the one of the allocated spectral fragments including a forward error correction (FEC) rate.

36. The apparatus of claim 35, wherein said splitter comprises:

an encapsulator configured to encapsulate sequential portions of said data stream into payload portions of respective encapsulating packets, each of said sequential portions of said data stream being associated with a respective sequence number included within a header portion of the respective encapsulating packet; and a master scheduler configured to selectively route encapsulated packets toward the modulators.

37. The apparatus of claim 36, wherein said splitter further comprises a plurality of sub schedulers, each of said sub schedulers configured to route packets received from the master scheduler toward a respective modulator.

38. The apparatus of claim 36, wherein said master scheduler is configured to route packets according to one of a random routing algorithm and a round robin routing algorithm.

39. The apparatus of claim 38, wherein the respective weight of an output sub-stream is defined by one or more of a preferred spectral fragment, a preferred spectral fragment type, a preferred communication channel, a preferred communication channel type, a preferred traffic type, or a preferred customer.

40. The apparatus of claim 36, wherein said master scheduler is configured to route packets according to one of a customer preference algorithm and a service provider preference algorithm, wherein each output sub-stream is associated with a respective weight.

* * * * *